(12) United States Patent
Greenwood

(10) Patent No.: US 6,803,967 B1
(45) Date of Patent: Oct. 12, 2004

(54) GENERATING MULTIPLE RAMPS

(75) Inventor: Jonathan Mark Greenwood, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 0 days.

(21) Appl. No.: 09/545,587

(22) Filed: Apr. 7, 2000

(30) Foreign Application Priority Data

Apr. 9, 1999 (GB) .............................................. 9908246

(51) Int. Cl.[7] .......................... H04N 9/74; G06T 11/20
(52) U.S. Cl. ...................... 348/584; 348/594; 345/441
(58) Field of Search ................... 348/594, 598, 348/181, 584; 345/619, 620, 441

(56) References Cited

U.S. PATENT DOCUMENTS

| | | | | | |
|---|---|---|---|---|---|
| 4,127,849 A | * | 11/1978 | Okor | .......................... | 345/427 |
| 4,730,261 A | * | 3/1988 | Smith | .......................... | 345/421 |
| 4,782,392 A | * | 11/1988 | Haycock et al. | ............. | 348/594 |
| 4,805,022 A | * | 2/1989 | Abt | .............................. | 348/594 |
| 4,823,183 A | * | 4/1989 | Jackson et al. | ............. | 348/578 |
| 4,942,341 A | * | 7/1990 | Imaizumi | ..................... | 348/584 |
| 5,198,731 A | * | 3/1993 | Wu | ............................. | 315/388 |
| 5,283,652 A | * | 2/1994 | Fairhurst | .................... | 348/594 |
| 5,608,465 A | * | 3/1997 | Lake | ........................... | 348/584 |
| 5,677,644 A | * | 10/1997 | Silverbrook et al. | ......... | 327/131 |
| 5,905,539 A | * | 5/1999 | Angell | ....................... | 348/594 |
| 6,356,125 B1 | * | 3/2002 | Greenwood | ................. | 345/427 |
| 6,433,833 B1 | * | 8/2002 | Greenwood et al. | ........ | 348/584 |
| 6,456,336 B1 | * | 9/2002 | Greenwood et al. | ........ | 348/593 |

* cited by examiner

*Primary Examiner*—Jeffery Brier
*Assistant Examiner*—Ryan Yang
(74) *Attorney, Agent, or Firm*—Frommer Lawrence & Haug LLP; William S. Frommer; Hans R. Mahr

(57) ABSTRACT

A solid generator allows multiple identical solids to be produced in respective ones of the tiles of a rectangular array of tiles. The tiles may occupy a whole frame, may be shifted relative to the edges of the frame. One row of tiles may be shifted relative to another row. The array may be passed across the frame. The tiles may occupy a part of the frame. A single ramp is defined by R=Ah+Bv_C where A, B and C are signed values, h=pixels along a line and v=lines. Values of A, B and C for various tiles are stored in registers C1, C2, C3, FB1, FB2, FB3 and used in relation to the individual tiles.

18 Claims, 39 Drawing Sheets

Fig. 6A                Fig. 6B
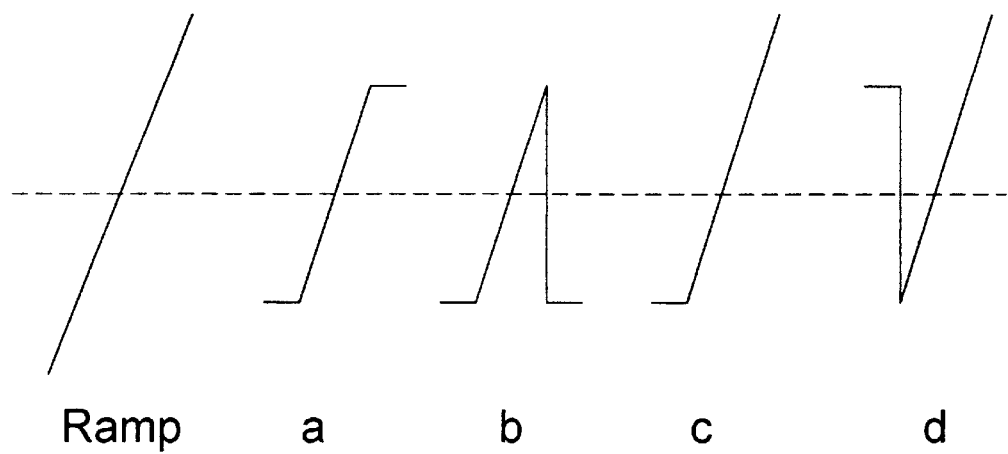
Fig. 7

ABSOLUTE

NEGATE

LIFT 0  00  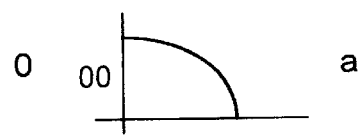  a       8   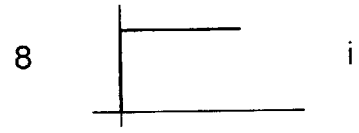  i
1  01  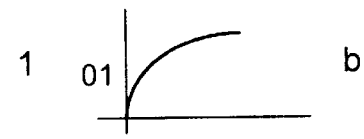  b       9   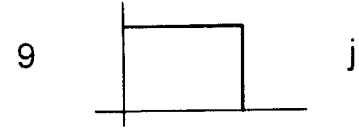  j
2  10  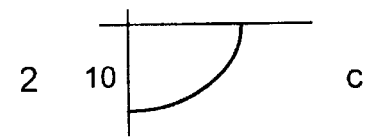  c       10  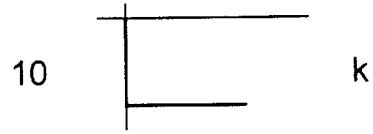  k
3  11  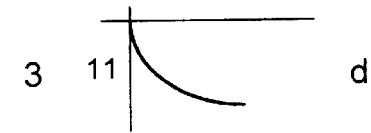  d       11  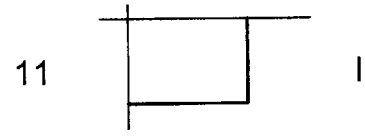  l
4      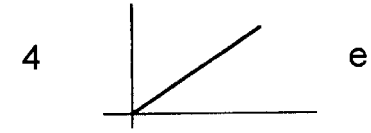  e
5      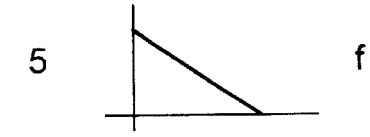 f
6      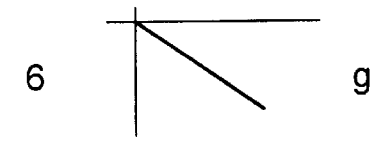 g                *Fig. 14*
7      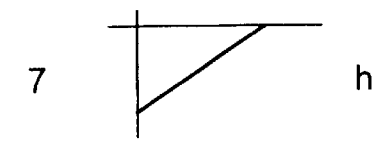 h

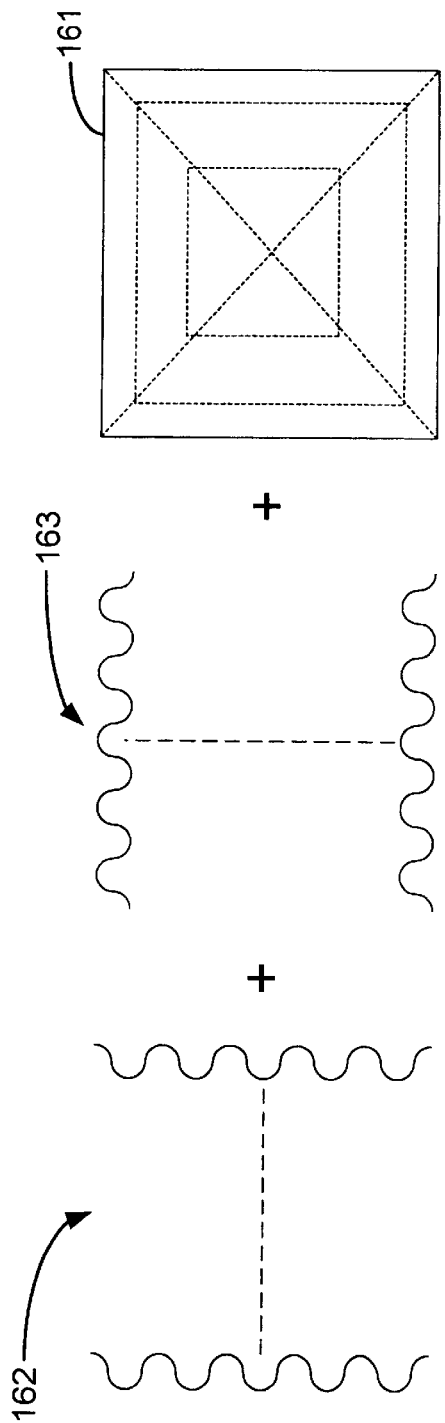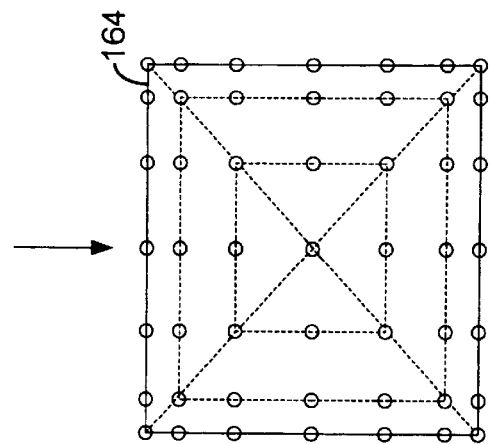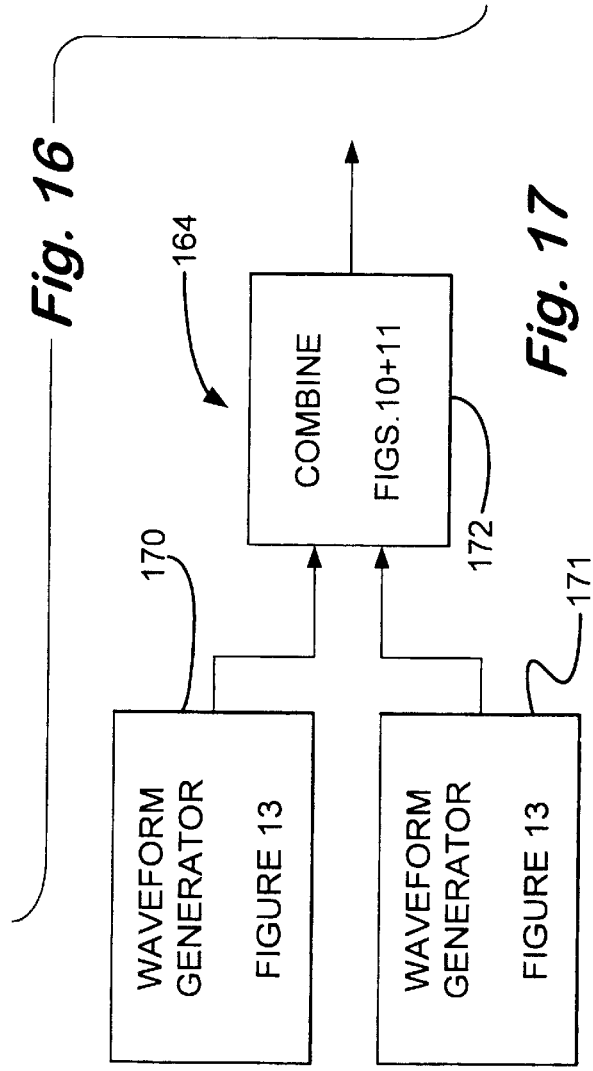
Fig. 16
Fig. 17

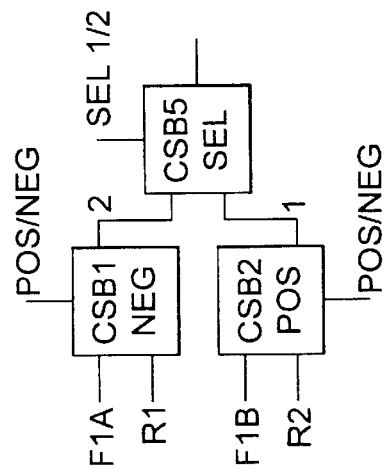
*Fig. 28A*
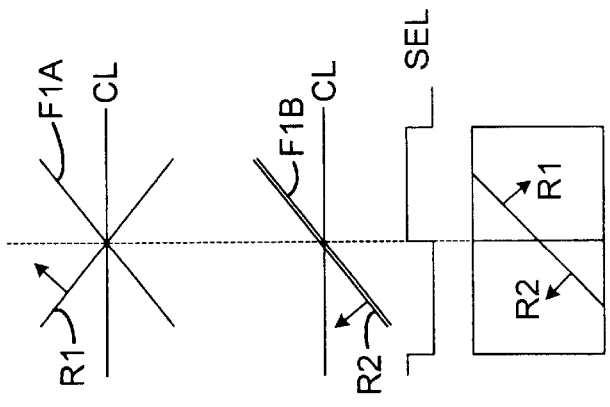
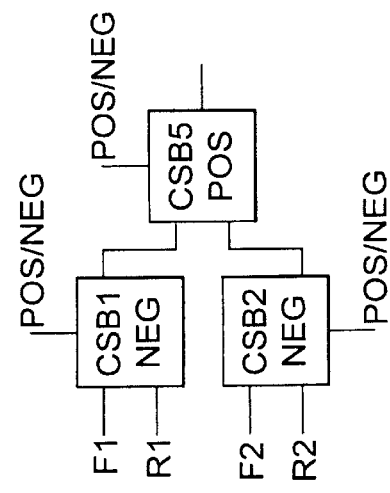
*Fig. 28C*
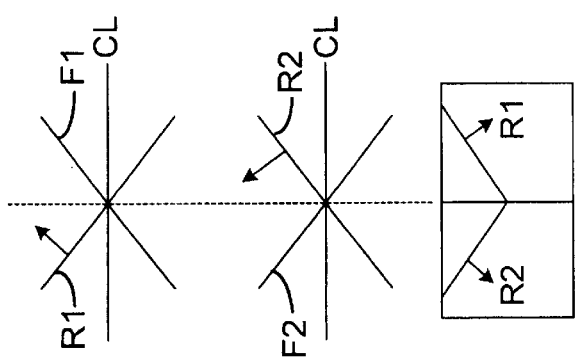

Fig. 29  NON-MASKING

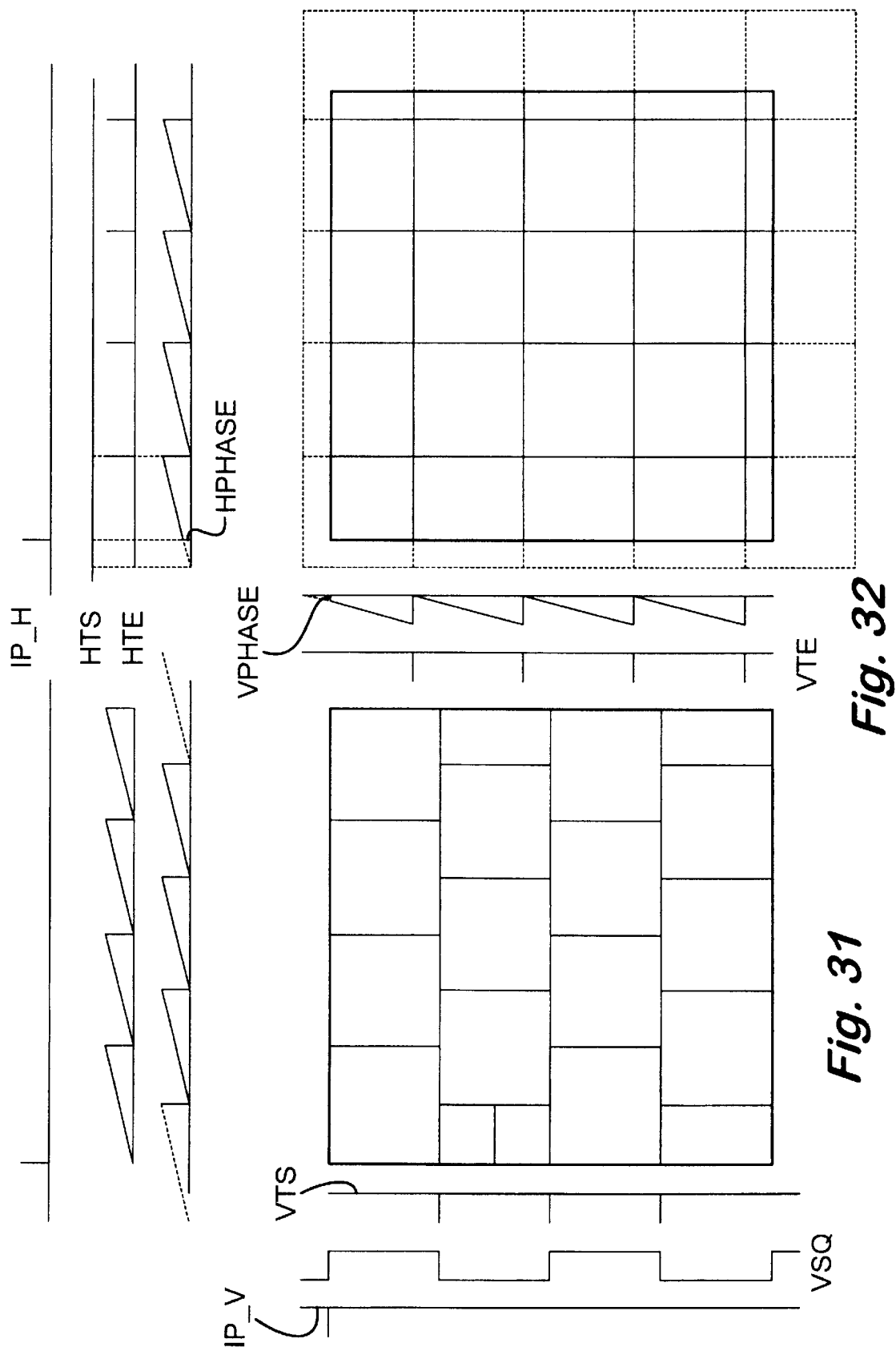

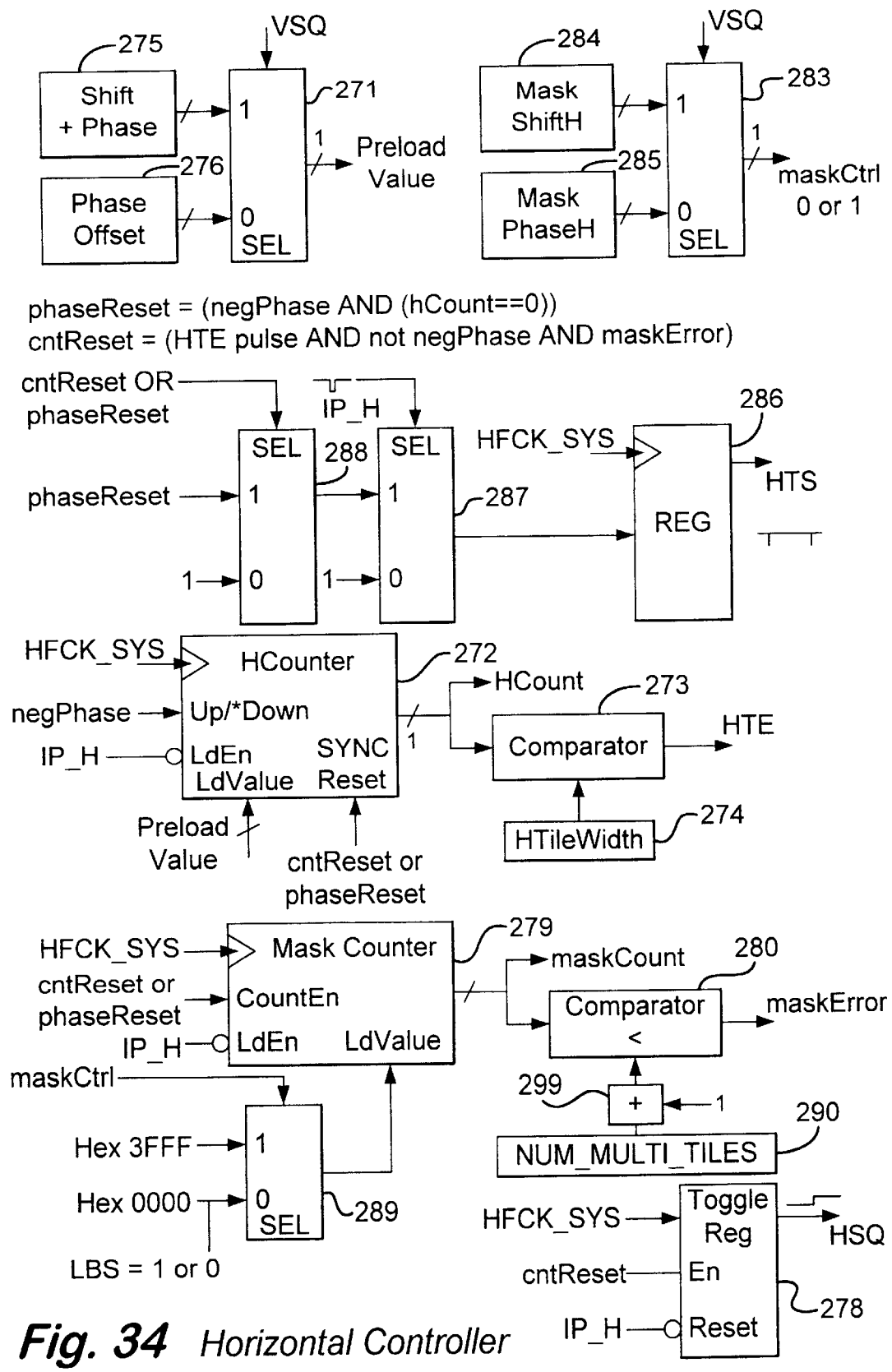
Fig. 34 Horizontal Controller

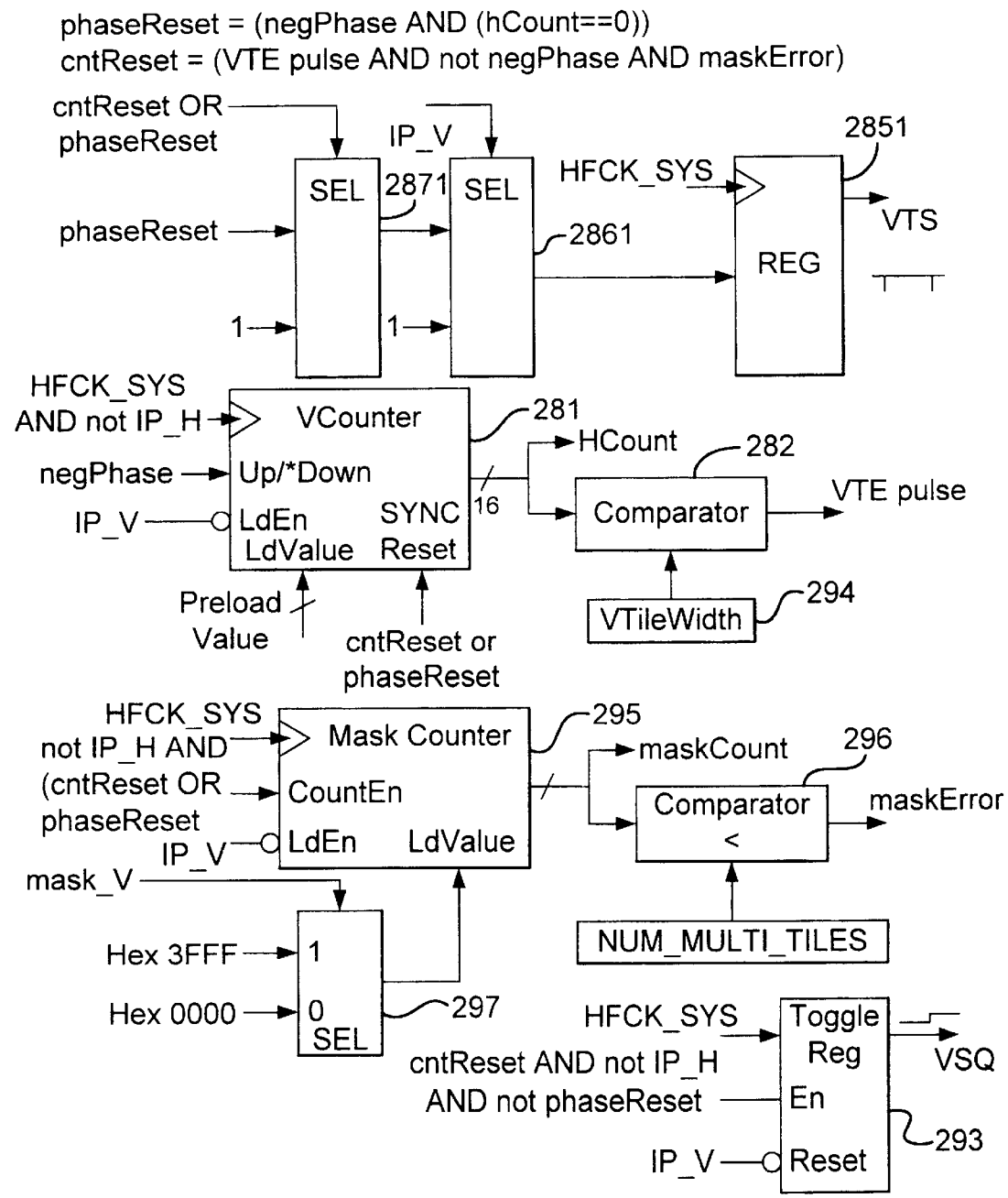
Fig. 35 Vertical Controller

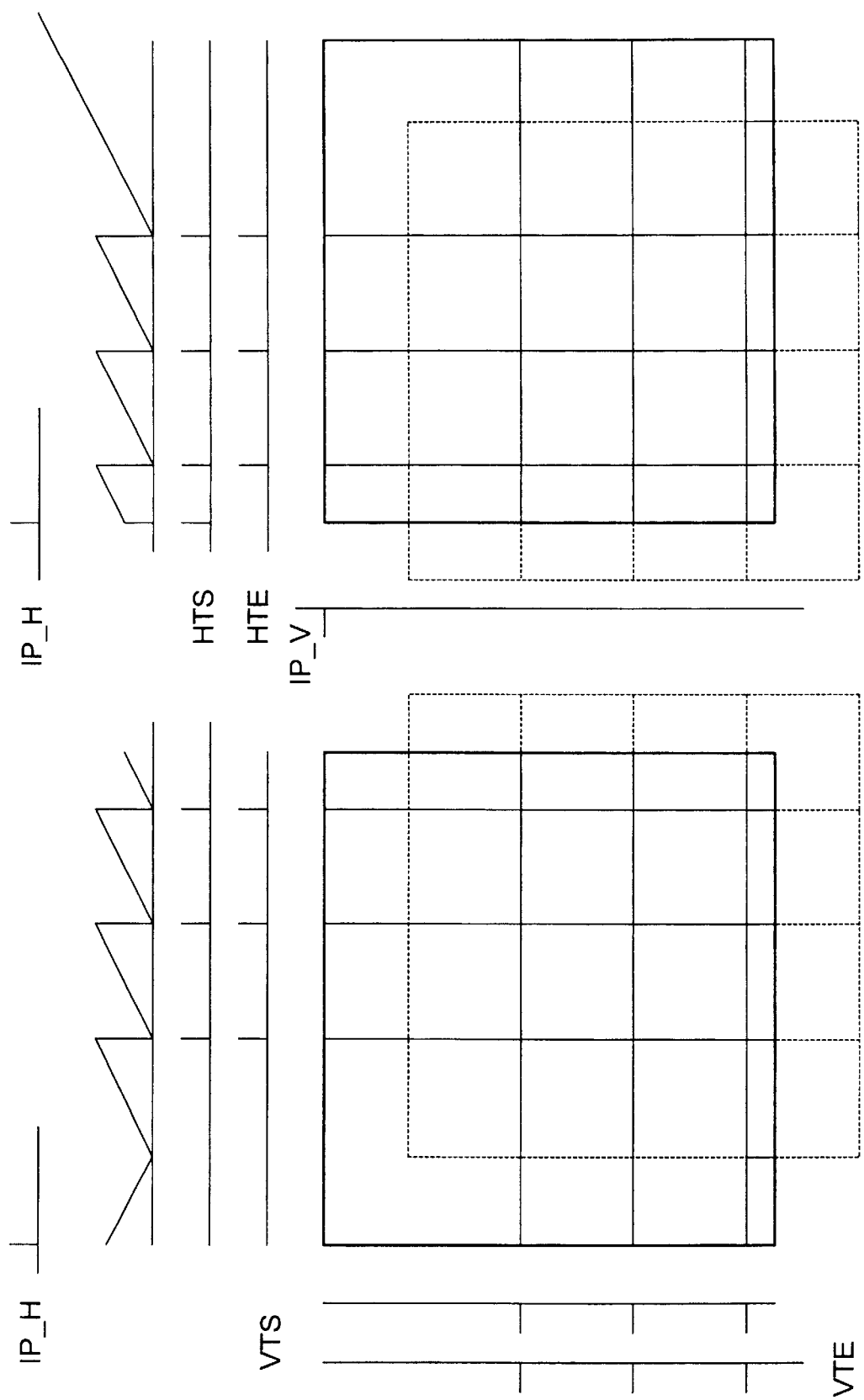

MASKING MODES
(Number of Multiples (horiz) = 4)

GENERATING MULTIPLE RAMPS

BACKGROUND OF THE INVENTION

1. Field of the invention

The present invention relates to a generator for generating multiple ramp signals. Such a generator is preferably for generating a 'solid' used in a video wipe generator of a vision mixer.

A solid is an electrical signal representing a three dimensional surface of a desired shape. It comprises at least one ramp signal and typically comprises a combination of at least two ramp signals which themselves may be modified. It may also comprise a signal defined by a polar coordinate system and representing a curved surface.

2. Description of the Prior Art

Reference will now be made to FIGS. 1 to 3 of the accompanying drawings which show background to the present invention.

FIG. 1 illustrates a known simple wipe between two video sources X and Y.

As the wipe proceeds as indicated by arrow W, video X is replaced across the display by video Y (or vice versa). The effect of a wipe is achieved by mixing the video sources X and Y according to $$KX+(1-K)Y$$

where K is a keying signal. The keying signal K is derived from a 'solid'. This will be explained with reference to FIGS. 2 and 3 i.e. a function having a value depending on the h and v co-ordinates within the picture, where v represents line number and h represents pixel position along a line.

FIG. 2 a illustrates a known example of a 'solid' which is a simple ramp. As shown in FIG. 2, a clip level CP is defined. It will be appreciated that over a field or frame, the clip level defines a plane referred to herein as the clip plane, which will be described in more detail with reference to FIG. 4 below. The keying signal K is, in known manner, derived from the solid by applying high gain to the solid and limiting the result, as shown in FIG. 2B. The keying signal has two levels 0 and 1. The transition between the levels occurs where the solid intersects the clip plane CP. The position of intersection is varied, to produce the wipe, by adding an offset to the solid.

FIG. 3 is a schematic block diagram of a wipe generator of a vision mixer comprising a solid generator, a clip element, a gain element, a limiter and a mixer which mixes video sources X and Y in dependence upon the keying signal K.

The solid generator produces a solid, for example a ramp as shown in FIG. 2A. The clip element applies an offset to the ramp to vary the intersection of the ramp with the clip plane CP as shown in FIGS. 2A to 2C. Gain is applied to the offset ramp, in the gain element and the result limited in the limiter to produce the signal K. The amount of gain applied may be varied as shown in FIG. 2B: that varies the slope of the transition between the limit values of the keying signal K.

The mixer mixes the video sources X and Y according to $$KX+(1-K)Y.$$

Thus if K=1, the output is X, if K=0 the output is Y.

If the gain applied to the solid is unity and the clip offset is zero, the solid and the keying signal are identical.

The present invention concerns the solid generator.

It is desired to produce multiple ramps. The production of multiple ramps allows multiple identical solids to exist in one video frame, allowing multiple wipes to occur in a frame.

SUMMARY OF THE INVENTION

According to one aspect of the present invention, there is provided a solid generator comprising:

a ramp generator for producing a ramp signal R $$R=Ah+Bv+C$$

where the coefficients

A, B and C are signed values, the ramp signal R being produced for each pixel of a predetermined set of pixels h where h=0 to n of each of a predetermined set of lines v where v=O to m;

a coefficient generator for generating the values of the coefficients A, B and C; and control means for causing the ramp signal to be generated with the same values of A and B in each of a plurality of contiguous areas of a picture.

The term "picture" used herein and in the claims is generic to a 'field' and to a 'frame'.

By providing a ramp generator and controlling it to produce a ramp repeatedly in each of a plurality of contiguous areas (referred to as 'tiles' in the following illustrative description) it is possible to create a plurality of identical solids (each of which maybe a single ramp) in the area.

According to another aspect of the present invention, there is provided a solid generator comprising a plurality P of ramp generators each for producing a ramp signal $$Rp=Aph+Bpv+Cp$$

where p=1 to P where the coefficients Ap, Bp and Cp are signed values, the ramp signal Rp being produced for each pixel of a predetermined set of pixels h where h=o to n of each of a predetermined set of lines v where v=o to m;

means for generating coefficients Ap, Bp and Cp for the ramp generators;

control means for causing each ramp signal Rp to be generated with its same values Ap and Bp in each of a plurality of contiguous areas of a picture; and means for combining the ramp signals.

By providing a plurality of ramp generators and controlling them to produce respective different ramps repeatedly in each of a plurality of contiguous tiles it is possible to create identical complex solids in the tiles.

In an embodiment of the invention boundary signals are produced indicating the boundaries of the tiles. By offsetting the boundary signals 'partial' tiles may be produced along e.g. a horizontal and/or vertical edge of the picture. The ramps are correspondingly offset in the 'partial' edge tiles so that the solid displayed in the part tile is identical to the solid in the corresponding part of an adjacent whole tile.

A row of tiles may be offset relative to an adjacent row of tiles by appropriate offsetting of the boundary signals and the ramps.

By continually varying the offsets, tiles may be made to pan across or up/down the picture.

A preferred embodiment of the ramp generator comprises:

means for storing the coefficients Ap, Bp, and Cp and first and second accumulated values, adding means for incrementing the first accumulated value by Ap and the second accumulated value by Bp, and control means by which, for each of the said lines v, the second accumulated value is incremented by the adding means by Bp to form Cp+Bpv which is stored as both the first and the second accumulated values, and for each pixel of the said set of pixels on each of the said lines the first accumulated value is incremented by the adding means to form Cp+Bpv+Aph which is stored as the first accumulated value and is output as Rp.

The storing means which are preferably registers allow the coefficients A, B and C to be easily changed for the purposes of generating different ramps.

By varying the content of the register storing Cp the offsetting mentioned above can be achieved.

The ramp generator does not require the use of multipliers.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 6 illustrates negating a ramp coefficient;

FIG. 7 illustrates examples of limiting the value of the ramp signal;

FIG. 14 is a diagram showing edge modulation patterns;

FIG. 16 is a simplified illustration of an example of solid modulation;

FIG. 17 is a schematic block diagram of a circuit for producing a solid modulation waveform;

FIGS. 28A to E illustrates some examples of rotary wipe patterns;

FIG. 29 shows multiple, identical, wipe patterns in a frame;

FIG. 31 shows multiple, wipe patterns in a frame with odd rows of patterns shifted;

FIG. 32 shows multiple, identical, wipe patterns in a frame with the patterns subject to horizontal and vertical phase shifts;

FIGS. 34 and 35 are schematic block diagrams of a horizontal and vertical control signal generators for controlling the production of the patterns of FIG. 29 to 33;

FIGS. 36A and B show other sets of multiple, identical, wipe patterns in a frame, the set of patterns being shifted relative to the frame;

DESCRIPTION OF THE PREFERRED EMBODIMENTS

Figure 5:
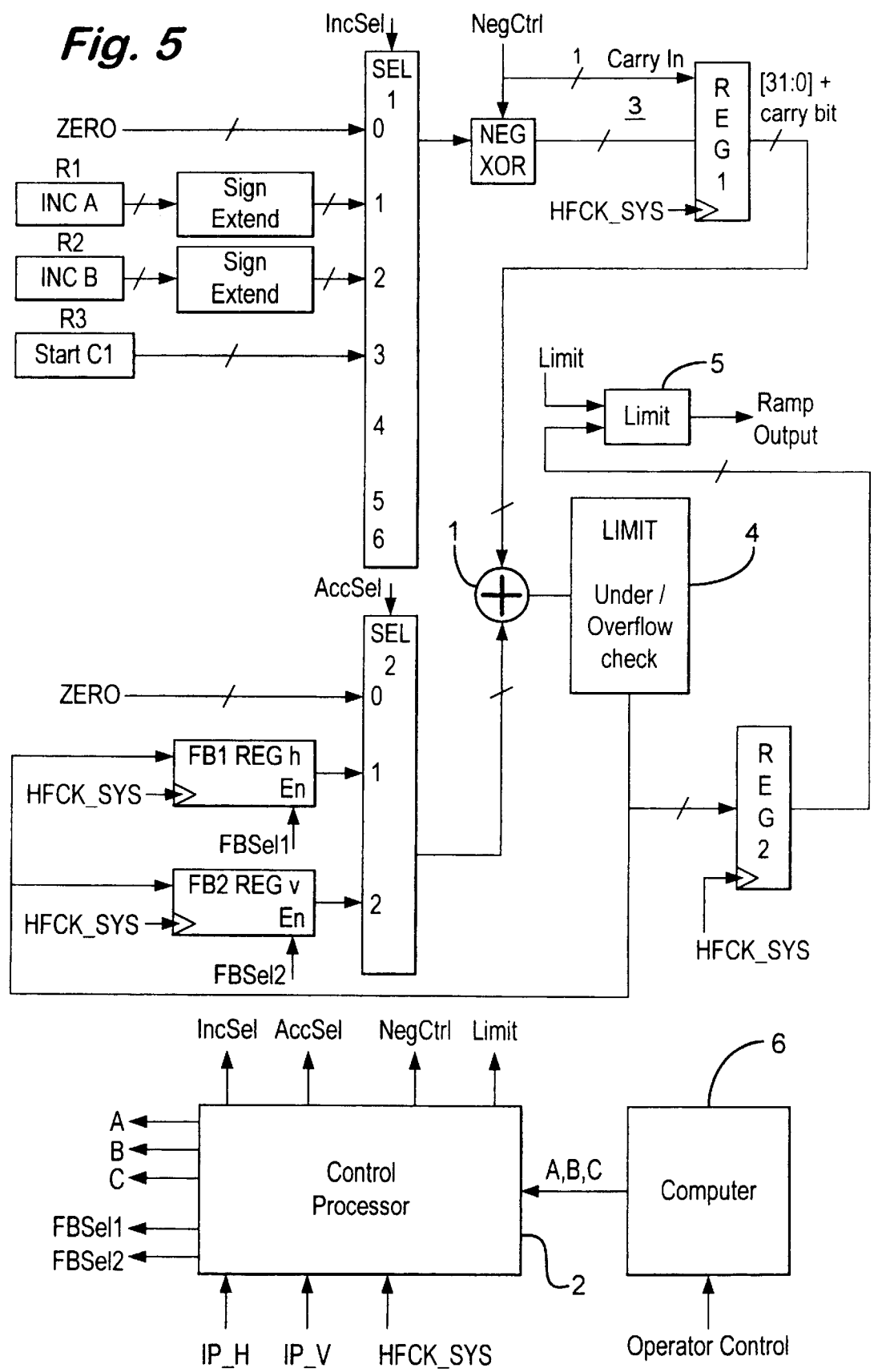
FIG. 5 is a block schematic diagram of an illustrative ramp generator.

The ramp generator of FIG. 5 produces a solid according to the equation $$R=Ah+Bv+C$$

where A, B, and C are selectable coefficients, v is line number and h is pixel position along a line. The equation defines a three dimensional ramp R in three dimensional space as shown by way of example in FIG. 4. The ramp value R is calculated from A, B and C individually for each pixel h on each line v. The values are represented by signed numbers, preferably twos complement numbers. As will be explained in more detail hereinafter, the value of h ranges from 0 to n and the value of v ranges from 0 to m.

The lines v of a field or frame over which the ramp is produced are selectable and the pixels h within those lines are also selectable provided the lines v are a contiguous set of lines and the pixels h are a contiguous set of pixels. The ramp may be generated in a field or in a frame. For ease of explanation the following description is based on the assumption that a progressively scanned frame is used.

The ramp values R can range from a negative maximum value −M through zero to a positive maximum value +M. The dynamic range DR of a ramp is such that the ramp may effectively be much larger in area than the area of an active frame of a video.

Figure 4:
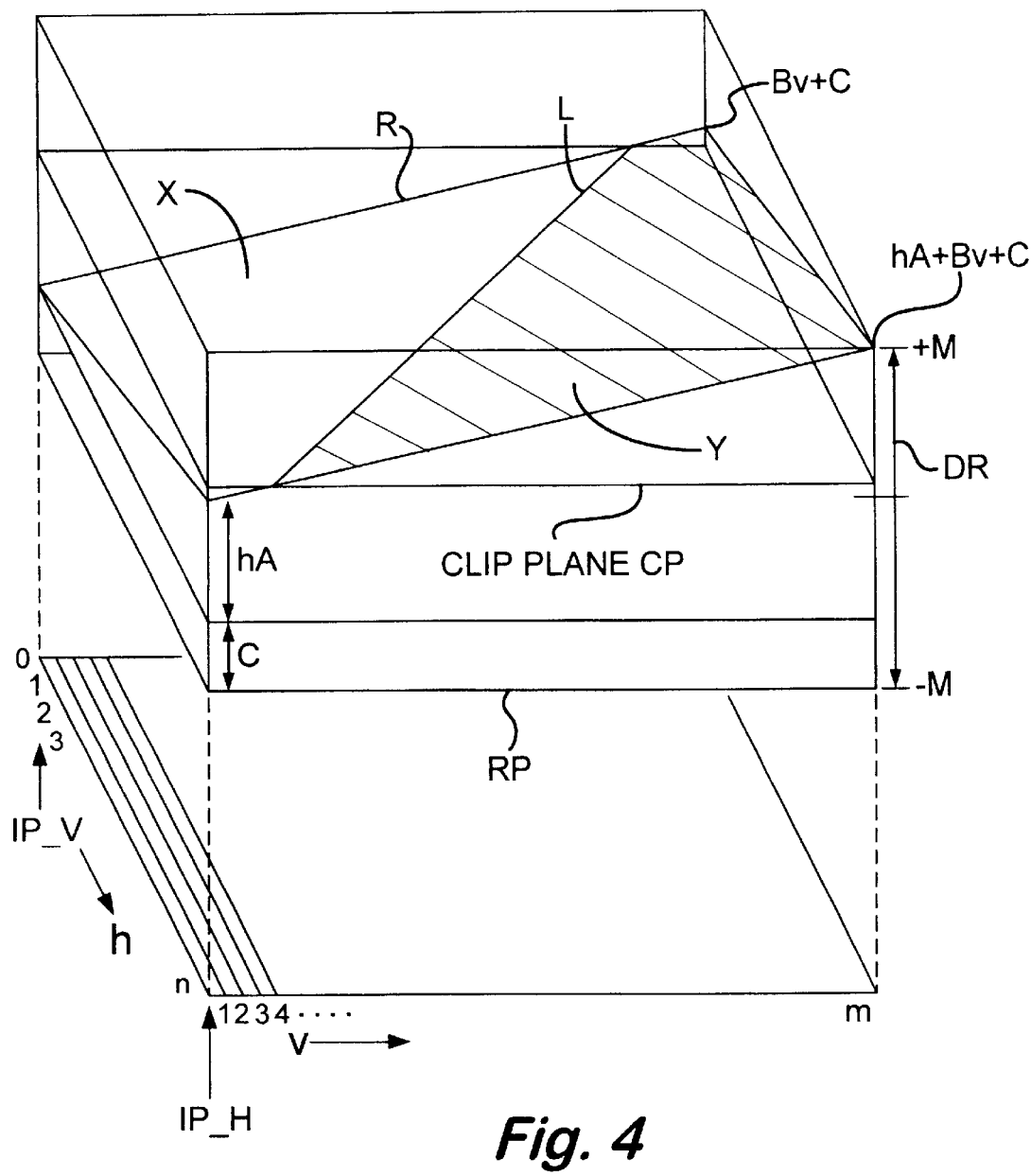
FIG. 4 is a diagram illustrating a solid together with a clip level.

Referring to FIG. 4 lines v of a whole progressively scanned TV frame are shown numbered 0, 1, 2 ... m. Pixel positions h of whole lines are shown as 0 to m. An illustrative ramp R is shown which is offset from a reference plane RP at −M by C.

Figure 1:
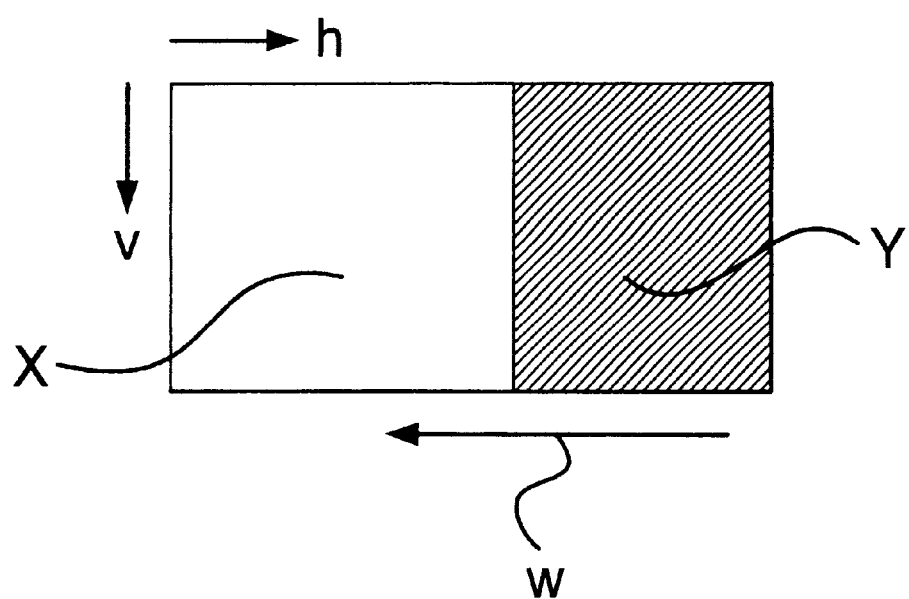
FIG. 1 illustrates a wipe.
Figure 2:
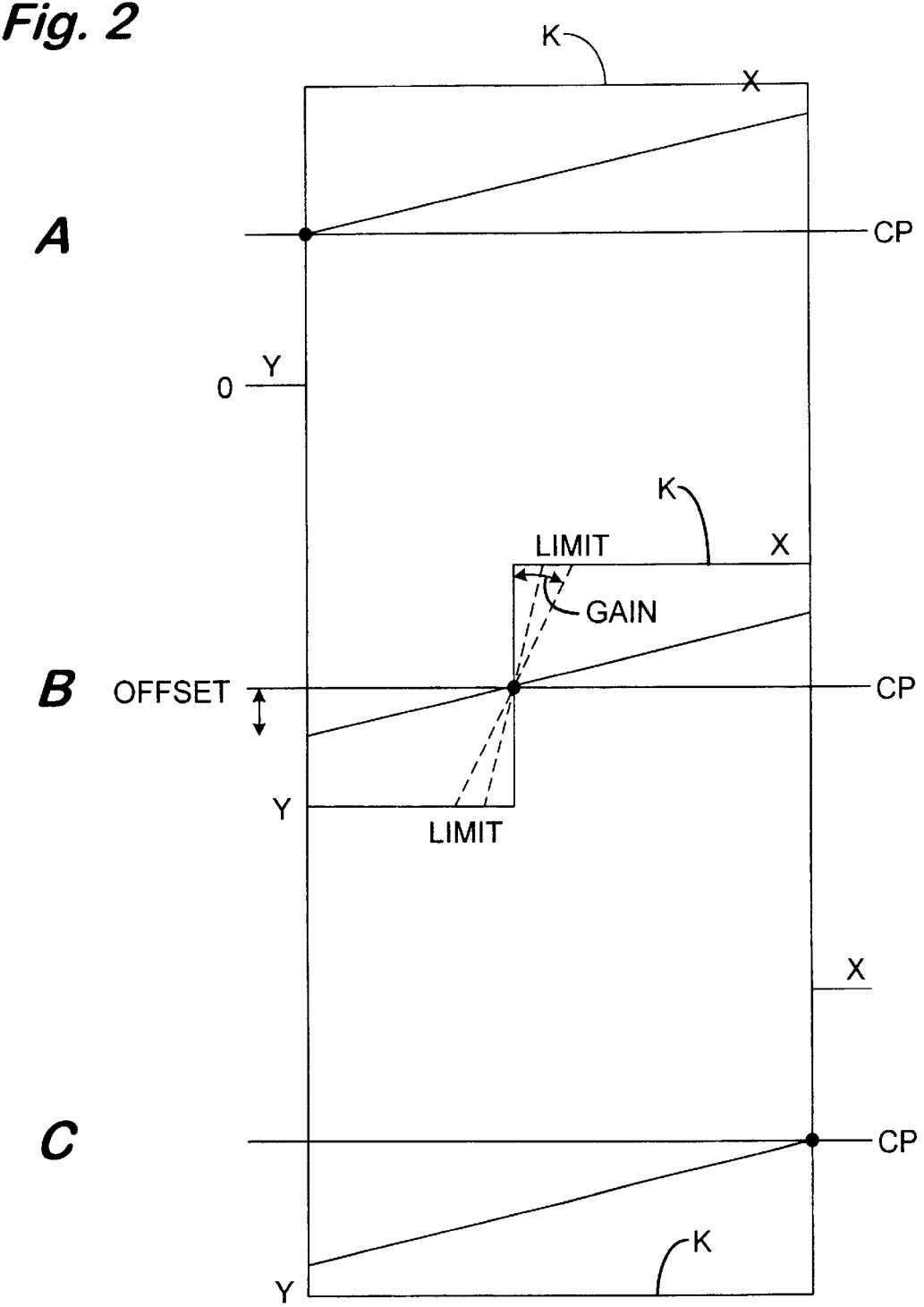
FIG. 2 illustrates a solid together with a keying signal.
Figure 3:
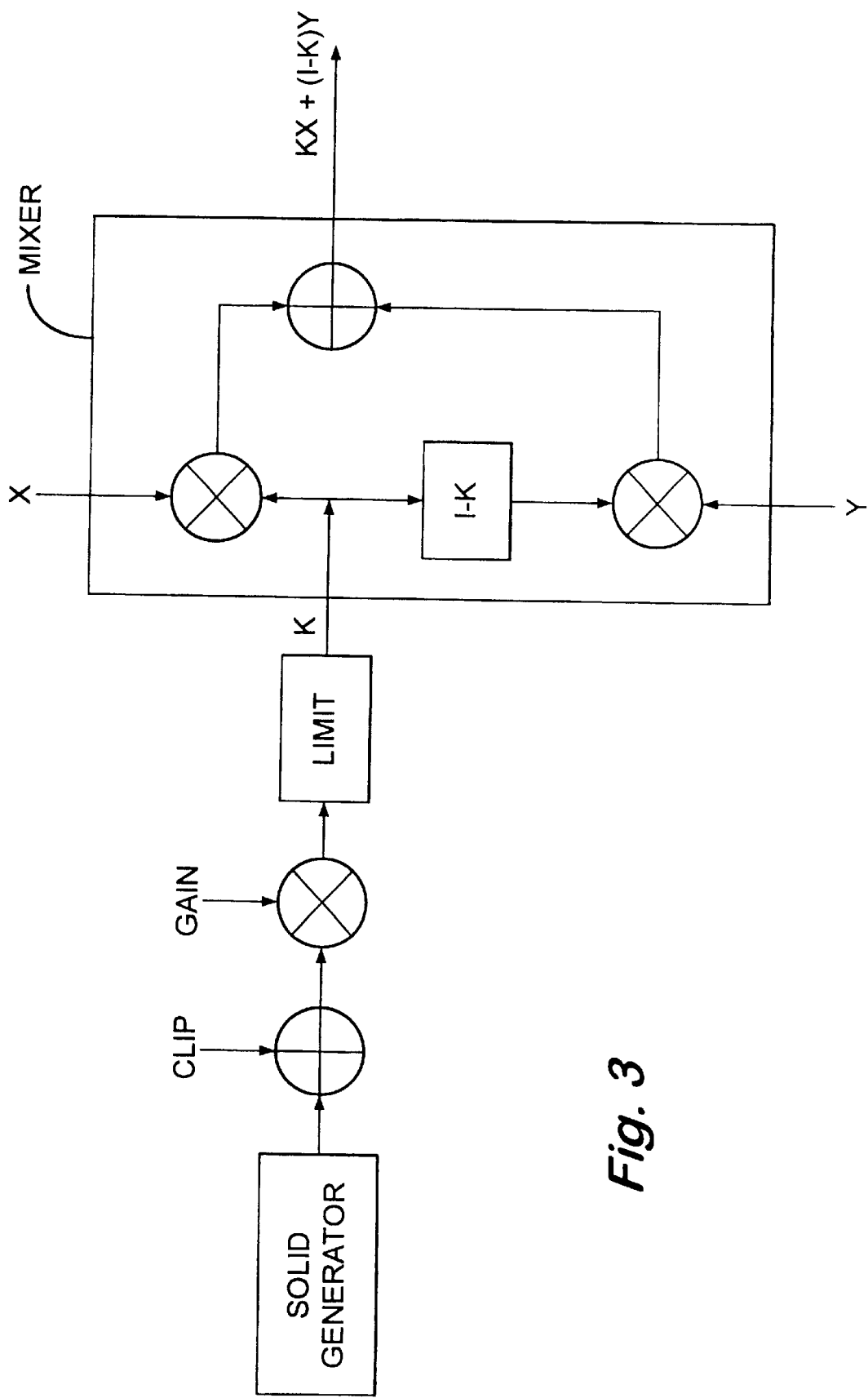
FIG. 3 is a schematic block diagram of a known wipe generator.

By way of initial and simplified explanation a clip plane represented by plane CP is shown in FIG. 4 intersecting the ramp R along a line L. The position at which the ramp intersects the clip plane CP is defined by the offset C. On line v=0 the ramp has slope A. For pixel h=0 on lines v, the ramp has slope B. The transition region of the keying signal K occurs along the line L. Where K exceeds the clip plane CP video from one source Y forms part of a displayed image and where K is equal to or less than the clip plane video from another source X forms the other part of the displayed image, as described above with reference to FIGS. 1 and 3.

The solid generator of FIG. 5 comprises registers R1(INC A),R2 (INC B) and R3 (Start C) for storing preselected values of the coefficients A, B and C. The registers R1, R2 and R3 are coupled to an increment selector SEL1 which selectively couples the registers R1 to 3 to an adder 1 via a register REG1 which is clocked by a pixel rate clock signal HFCK_SYS. Feedback registers FB1 and FB2 are coupled to another, feedback selector SEL2 which selectively connects the feedback registers FB1 and 2 and an input of ZERO to the adder 1. The output of the adder is connected to an output register REG2 also clocked by the pixel clock HFCK_SYS. The registers R1 to 3 and FB1 and FB2 and the selectors SEL1 and 2 are controlled by a real-time controller which receives line pulses IP_H and frame pulses IP_V and the clock HFCK_SYS and produces IncSel and AccSel signals for controlling the selectors SEL 1 and 2. The controller also controls the loading of the coefficients A, B and C into the registers R1 to R3.

A computer 6 generates the coefficients A, B and C and control data for each frame, in advance of the frame, and provides the coefficients and the control data to the real-time controller 2. The controller 2 feeds the coefficients to the registers R1, R2, R3. The computer 6 acts as an interface between operator controls and the controller 2. It generates the coefficients A, B and C in accordance with the setting of the controls by the operator.

The generator operates as follows with reference to FIG. 4. The basic principle is that the adder 1 adds an increment from one of the registers R1 to R3 to an accumulated value stored in one of the registers FB1 and FB2 and feeds the sum back to one of the registers FB1, FB2 for addition to another increment.

Referring to FIG. 4, assume for ease of description that a ramp R is to start at pixel h=0 of line v=0 with an offset C and coefficients A and B. Assume A, B and C are loaded into the registers R1 to R3 once per frame. The controller, on receiving a frame start pulse IP_V indicating the start of the active lines of a frame, causes selector SEL1 to select the value C in register R3 and feed it to the adder 1 via the register REG1 on a first HFCK_SYS pulse. At the same time, the selector SEL2 selects the value ZERO and feeds it to the adder 1. The sum C+0 is fedback to the registers FB1 and FB2 and stored in both of those registers. The sum is also fed to the output register REG2 for outputting on the next HFCK_SYS pulse coefficient (A) is selected from register R1 by selector SEL1, and FB1 is selected from by selector SEL2. Register FB1 now accumulates successive increments of C+hA along line v=0 for h=0 to n. At the end of the line the store FB1 contains C+nA. Pulse IP_H, indicating the beginning of a new line, occurs and increment B is selected from register R2 by selector SEL1, and selector SEL2 selects the content C of register FB2. Coefficient B from register R2 and C from FB2 are added in adder 1 to produce a new sum B+C which is fed back to both registers FB1 and FB2. Thus both contain the ramp value B+C for the beginning of line v-1 at position h=0. The selector SEL2 selects register FB1 which now accumulates C+B+hA for h=0 to n along line v=1 until the end of the line when the next IP_H pulse occurs. At the end of line v=1 the register FB1 contains C+B+nA. The selectors again select coefficient B in register R2 and register FB2 to increment the contents of FB1 and FB2 to C+2B at the beginning of line v=2. Register FB1 then accumulates by A along line v=2 until pulse IP_H occurs and registers FB1 and 2 are again incremented by coefficient B. The process repeats line by line until the next pulse IP_V occurs indicating the end of the frame and the beginning of the next frame. The whole process repeats for each frame.

It will be appreciated that the ramp is built up pixel by pixel in synchronism with the clock signals HFCK_SYS.

The foregoing description assumes that the ramp occupies a whole frame. A ramp may occupy only a part of a frame as will be described with reference to FIGS. 29 to 39, for example.

Inverted Ramps

The foregoing description describes ramps in which the value R of the ramp is successively incremented i.e. increased for each addition of a coefficient A or B. The generator of FIG. 5 allows a ramp value to be successively decremented to produce an inverted ramp. This is done using a negate circuit 3, comprising an EXOR circuit and the register REG1, and which negates the increments held in the registers R1 to R3 after selection by the selector SEL1. The increments are in 2s complement form. Negating a 2s complement number is done by inverting the bits of the number and adding one. The EXOR circuit inverts the bits of the selected increment in response to a negate control bit negCtrl and the negate control bit is fed into the register REG1 as a carry bit to add one. Thus as shown in FIG. 6A for a one dimension of a ramp 60, a positive ramp 60 is produced in the manner described above upto a desired maximum level and then as shown in FIG. 6B it is successively decremented using the negated increments. The operation of the ramp generator is otherwise unchanged. The negate control bit neg Ctrl is provided by the controller. It is possible to produce an inverted ramp over a frame by negating the coefficient A and/or B.

Limiting Ramps.

In order to prevent over or under flow, a limiter 4 is provided in the feedback path from the adder to the feedback registers FB1 and FB2. Another limiter 5 is provided at the output of the generator. Referring to FIG. 7 this output limiter 5 may limit a positive extreme ramp value to a positive limit or a negative limit as shown in FIG. 7a and 7b or limit a negative extreme value to either a negative or a positive limit as shown in FIGS. 7c and d. The limiter is controlled by the controller to select the desired limiting property.

Effects of Varying A, B and C

Increment A defines the slope of the ramp in the line direction. Increment B defines the slope of the ramp in the frame direction, perpendicular to the line direction.

A and B together can have the effect of rotating the ramp in space if they are scaled differently. C offsets the ramp in a direction perpendicular to the line and frame directions. C has the effect of shifting the intersection of the ramp with the clip plane. By varying C the position of a ramp can be moved in a frame.

Example of a Solid Generation System Combining Ramps

Figure 8A:
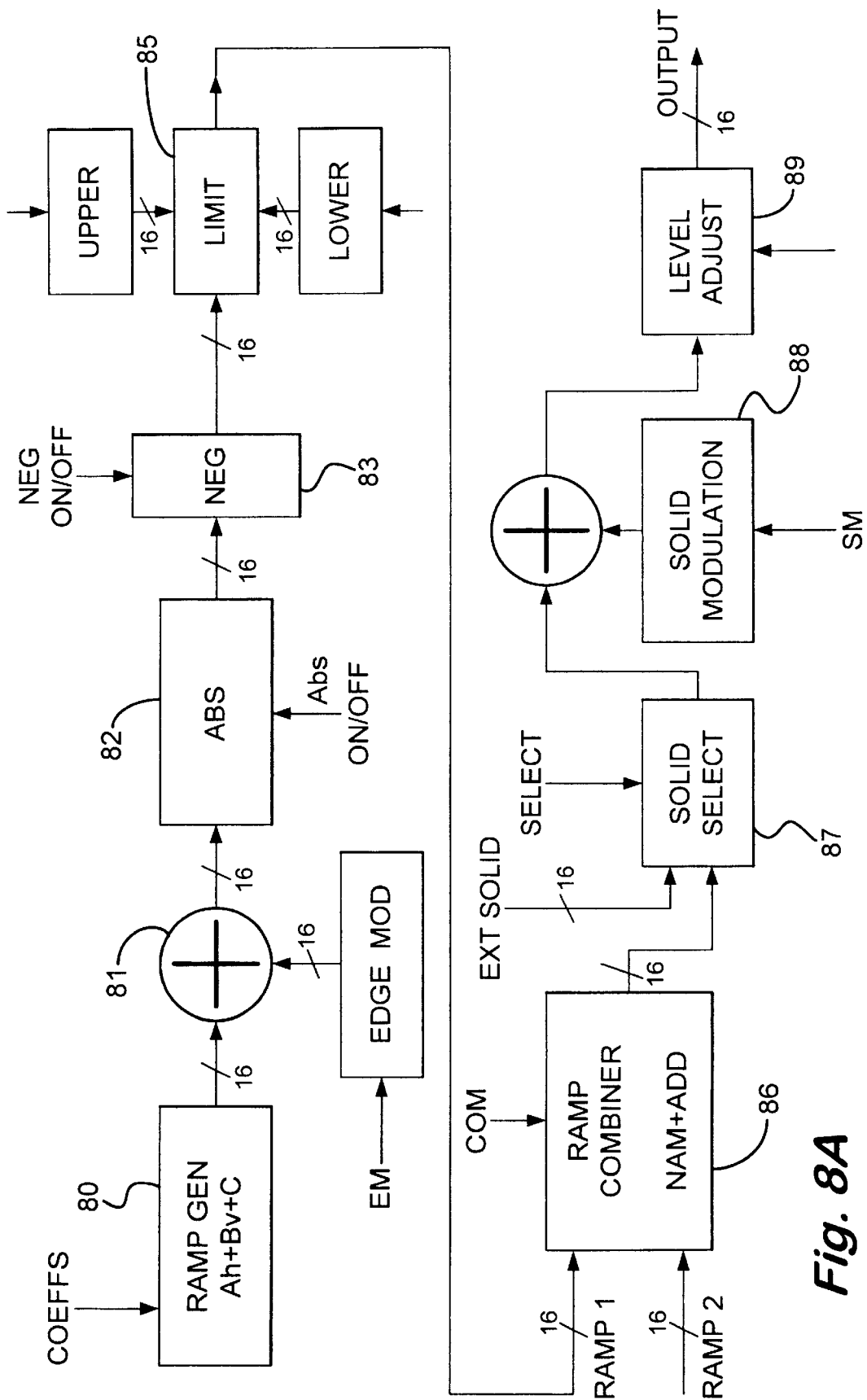
FIG. 8 is a block diagram of a solid generator system.
Figure 8B:
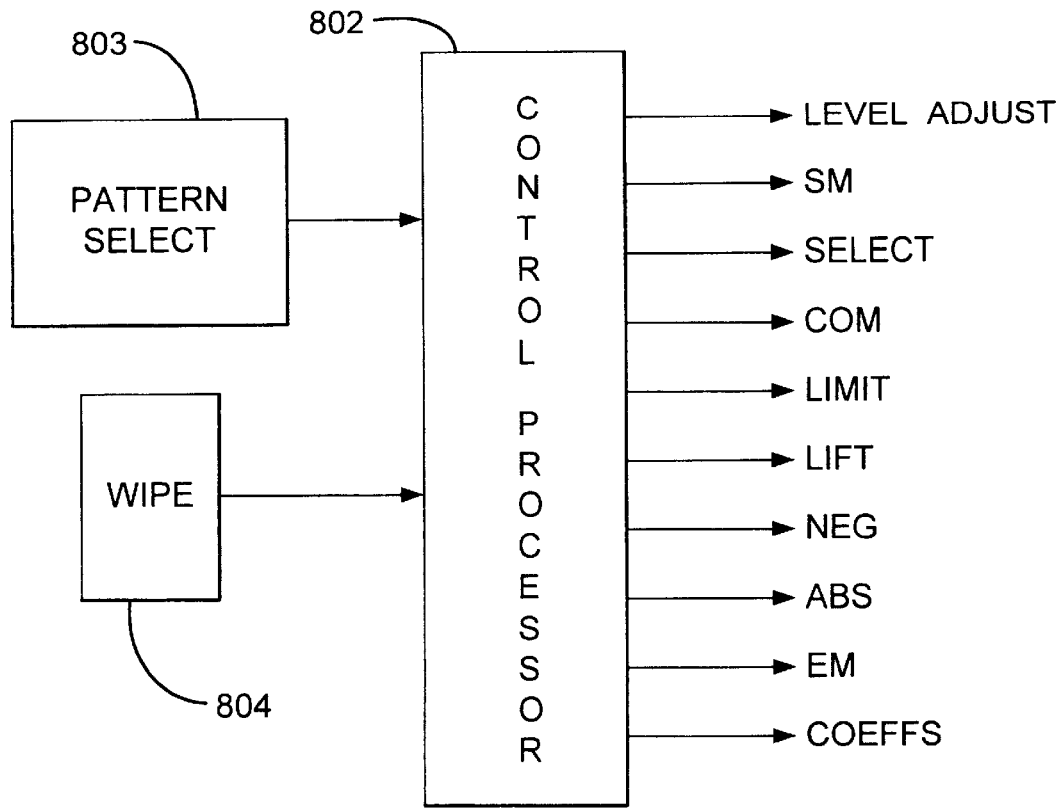

Referring to FIG. 8, there is shown a simplified block diagram of a solid generation system. The generation system comprises a plurality of ramp generators 80 as described for example with reference to FIGS. 5 to 7. The system of FIG. 8 has only two, ramp generator (and only one is shown) but there may be many more, for example 8 ramp generators. The ramps are combined in a combiner 86. In the combiner, the ramps are combined in a manner defined by control signals.

Each ramp generator produces a ramp which may be 'edge modulated' 81 as described with reference to FIGS. 12 to 15. The ramp may also be subject to absoluting, negating, offsetting and limiting as indicated by blocks 82 to 85. A "box solid" produced by combining two absolute ramps will be described with reference to FIGS. 9, 10 and 11. Ramps may be combined in the combiner 86 as will be described with reference to FIG. 10. The level and scale of the solids relative to the clip plane may be adjusted by an adjuster 89. A solid selector 87 selects the solid from the combiner 86 or a solid generated externally.

It will be appreciated that the system of FIG. 8 is illustrative only. The techniques of ramp generator, edge modulation and solid modulation, may be used in other solid generator systems as will also be described hereinbelow.

The system is controlled by a controller 802. The controller 802 stores and implements algorithms which define wipe patterns which are selected by a control panel 803.

Figure 9A:
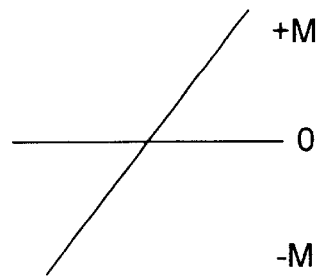
FIGS. 9A to E are diagrams illustrating absoluting, negating, lift and combining operations.
Figure 9B:
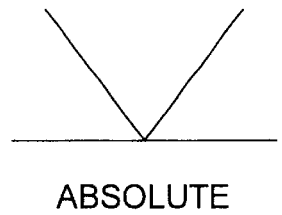
Figure 9C:
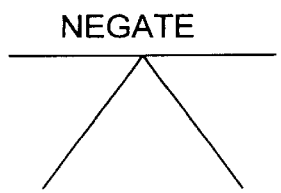
Figure 9D:
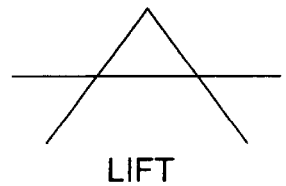

FIG. 9A shows a single ramp which has a dynamic range of −M through to zero to +M. The ramp is represented by (signed) twos complement numbers. An absolute function (82), in known manner, transforms all the numbers representing the ramp to positive numbers, thus producing a ramp as shown in FIG. 9B. The ramp of FIG. 9B may be negated 83 as shown in FIG. 9C, i.e. it is represented by negative numbers. The absolute ramp may be subject to an offset 84 by adding a fixed value to the ramp. FIG. 9D shows the negated, absolute ramp of FIG. 9C with an offset. The ramp of FIG. 9B may be offset in similar manner.

Figure 9E:
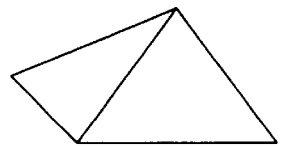

In general a ramp may be modified by any one or more of absoluting, negating and offsetting. FIG. 9E shows, as an example of a solid, a "square" solid, which is a rectangular pyramid formed by combining two ramps shown in FIG. 9D, one ramp being at right angles to the other.

Figure 10:
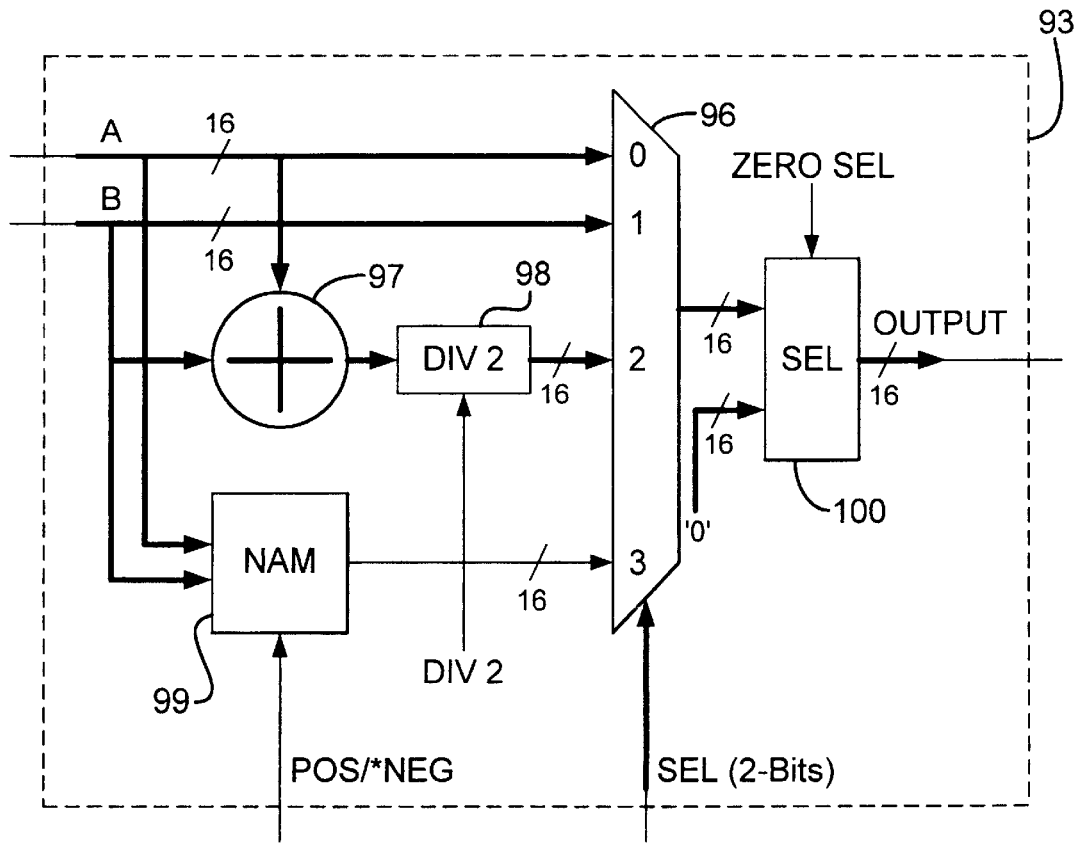
FIG. 10 is a block diagram of a ramp combiner.

An example of a preferred combiner is shown in FIG. 10. Two ramps A and B (which may be modified by the processing circuits 81 to 85) are fed to a selector 96 having inputs 0 to 3. Input 0 receives ramp A. Input 1 receives ramp B. Input 2 receives a first combination of the ramps from a first combining circuit 97 and a divide-by-2 circuit 98. Input 3 receives a second combination of the ramps from a second combining circuit 99. The one of the inputs 0 to 3 to be coupled to the output of the selector is selected by a two bit selection signal SEL. The output of the selector 96 is coupled to the output of the combiner 93 via another selector 100 which selects the output of the selector 96 or zero according to a zero select signal. If the select signal SEL is 0 or 1, ramp A or B is passed to the output unmodified. The combiner 93 then acts as a switch or signal router.

The first ramp combining circuit comprises an adder 97 and a divide by two circuit 98. The divide by two circuit has a control input for receiving a divide-by-2 control signal. The divide-by-2 control signal selectively actuates the divide-by-2 circuit 98. Thus input 2 of the selector 96 receives either (A+B) or (A+B)/2.

Figure 11:
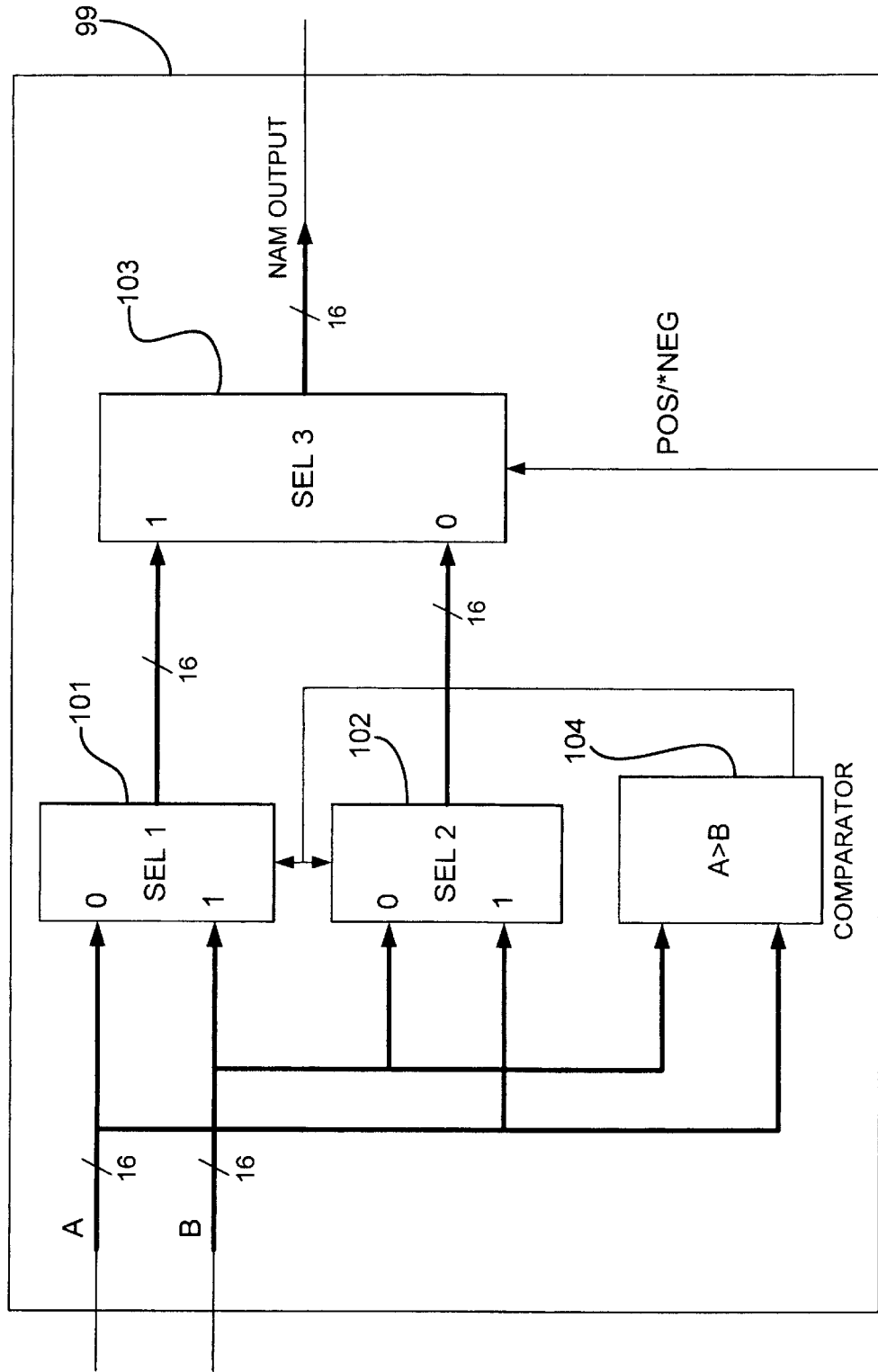
FIG. 11 is a block diagram of a non-additive mixer of the combiner of FIG. 10.

The second ramp combining circuit 99 is a Non-Additive Mixer also known as a NAM an example of which is shown in FIG. 11. Referring to FIG. 11, the NAM comprises first second and third selectors 101 102 and 103 and a comparator 104. The comparator compares the instantaneous values of the ramps A and B. If A>B then it outputs logic 0 otherwise it outputs logic 1. The first and second selectors select input 0 or 1 according to the output of the comparator. The third selector selects the first or second selector according to the value of a POS/NEG signal. The overall truth table of the NAM is:

| COMPARISON OF RAMPS | POS/NEG | OUTPUT OF NAM |
| --- | --- | --- |
| A > B | POS | A |
| B > A | POS | B |
| A > B | NEG | B |
| B > A | NEG | A |

For POS/NEG POS, the NAM outputs whichever of A and B is greater at any moment in time, i.e. at any pixel position. For POS/NEG NEG the NAM outputs whichever of A and B is smaller.

Overall, the combiner 93 selects one of the ramps A and B, an additive combination of the ramps, a non-additive combination of the ramps or zero.

Box Solid

A 'box solid' is a well known solid. Referring to FIGS. 9, 10 and 11, it may be produced by absoluting two ramps at right angles to each other and combining them using a negative NAM function. The result is a square pyramid as shown in FIG. 9E. Another solid may be produced using a positive NAM function. Other solids can be produced using the add function.

Edge Modulation

Figure 15A:
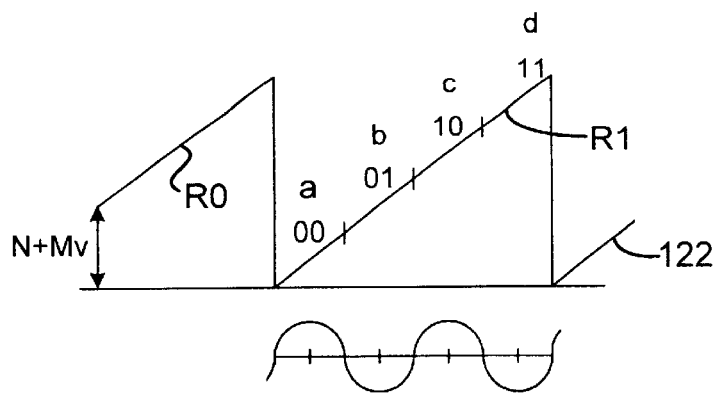
FIGS. 15A to E illustrate the operation of the edge modulator.
Figure 15B:
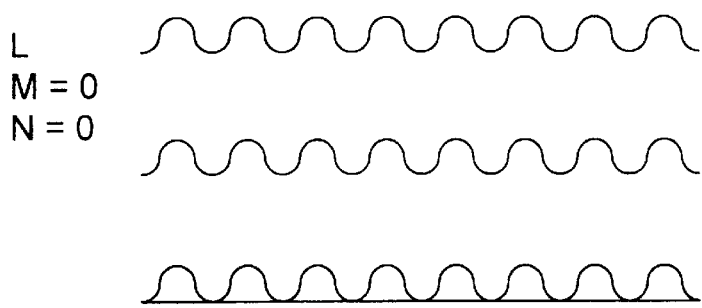
Figure 15C:
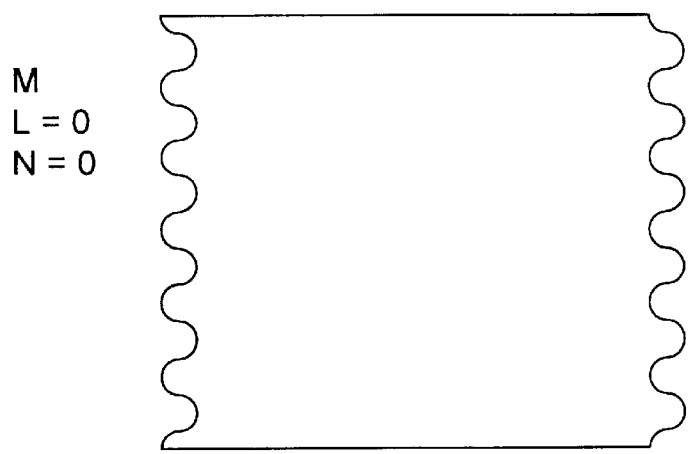
Figure 15D:
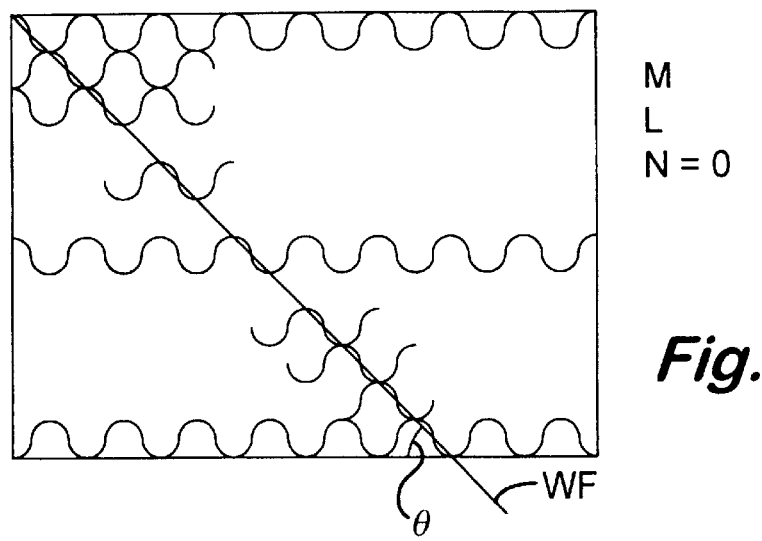
Figure 15E:
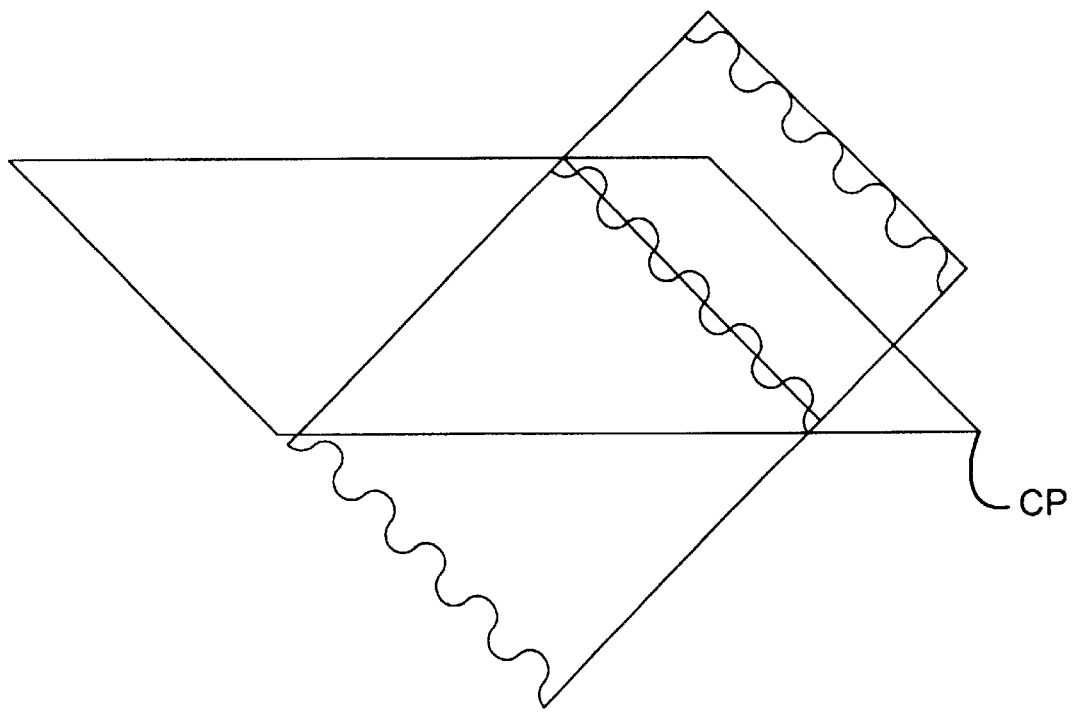

FIG. 15B shows one example of an edge modulating signal. The signal comprises a sine wave in the line direction and which repeats on every line of a frame. FIG. 15C shows a sine wave which is in the frame direction and which repeats in the line direction. FIG. 15D shows a sine wave in the line direction but which is phase shifted from line to line the result being a set of waves having a wavefront WF directed at an angle θ to the line direction. FIG. 15E shows a solid, in this case a simple ramp, combined with a frame of sine waves as shown in FIG. 15C which modulates the whole ramp to effect edge modulation at the clip level CP.

Figure 12:
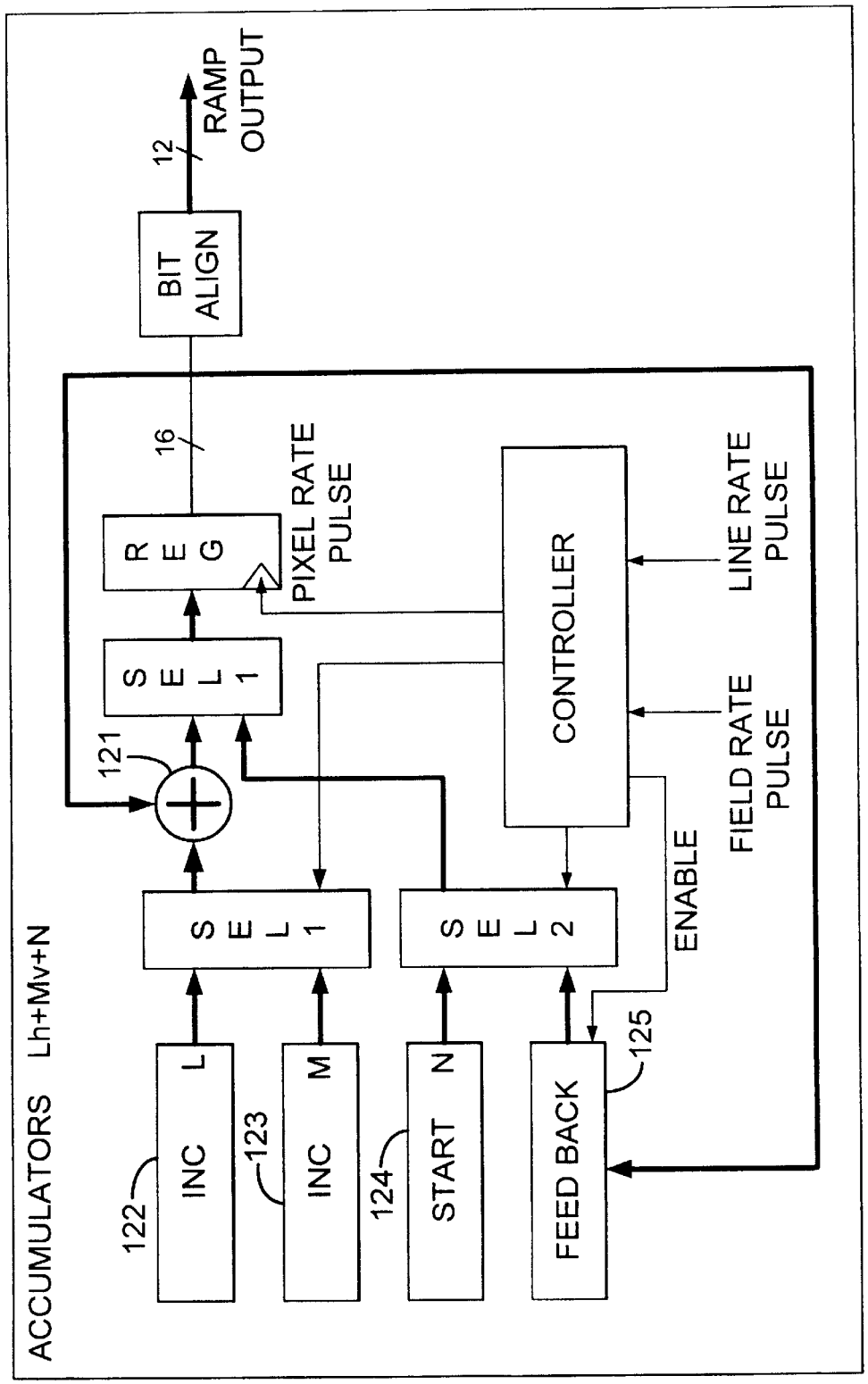
FIG. 12 is a schematic block diagram of another ramp generator for use in an edge modulator.
Figure 13:
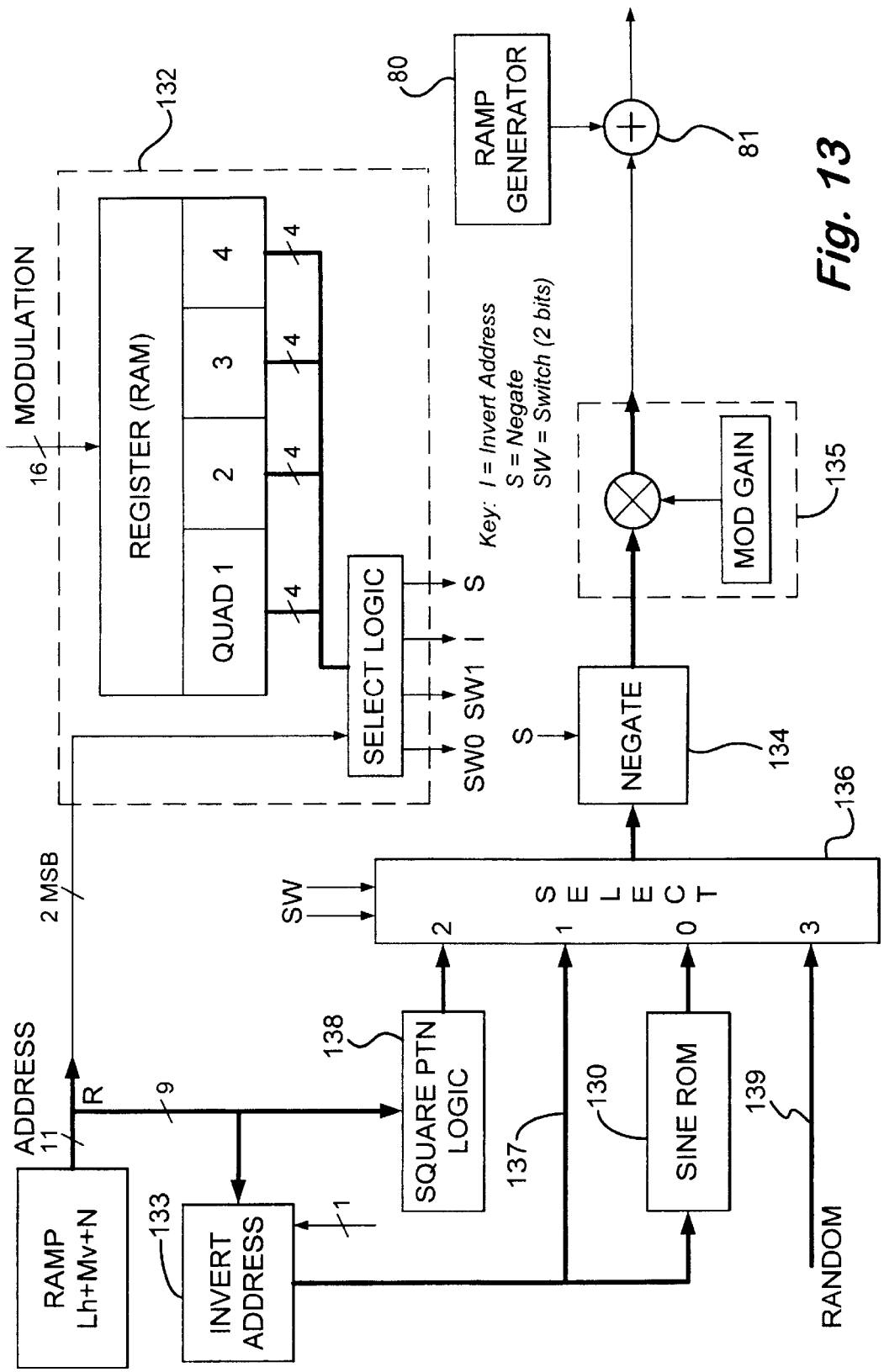
FIG. 13 is a schematic block diagram of an edge modulator.

The edge modulation function is produced by a ramp generator as shown in FIG. 12 which produces a ramp output which is transformed by the circuit of FIG. 13 to produce the desired edge modulation wave form. For ease of explanation FIGS. 12 and 13 will be described initially with reference to the production of a sine modulation signal as shown in FIG. 15A.

Referring to FIG. 12 the ramp generator comprises an output register REG which is clocked at the pixel rate by a clock signal HFCK_SYS. The output of the register REG is fedback to one input of an adder 121 which has another input coupled by a selector SEL1 to coefficient registers 122 and 123 which store coefficients L and M. The adder is coupled to the register REG via a selector SEL3. Ignoring the selectors, the register REG and the adder 121 form an accumulator which successively adds a selected coefficient to the contents of register REG. The register is not reset: once it has accumulated its maximum value e.g. all '1's it reverts to its minimum value e.g. all '0's. The register REG thus repeatedly outputs a sequence of values.

The selector SEL3 allows the register REG to be preloaded with a value N in a register 124 or the value in a feedback register 125 selected by a selector SEL2. The value stored in register REG is incremented by a coefficient L or M selected by the selector SEL1.

The generator operates as follows to produce a ramp signal according to the equation $$R = Lh + Mv + N$$

where h is pixel position along a line, and v is line number, the numbers h and v are ordinal; h=0 to n and v=0 to m.

At h=0 on line v=0, the selectors SEL2 and 3 select the coefficient N from register 124 and preload register REG with N. The register REG outputs N which is feedback to the adder 121 and to the enabled fedback register 125 where it is stored. On pixel h=1 the value N is incremented by value L selected from register 122 by selector SEL1, so that register REG contains N+L which is output and fedback to the adder 121, but not to the feedback register 125 which is disabled. The register REG and the adder then accumulate N+hL. Once the register REG contains its maximum value N+hL for the first time it rolls over and repeats the accumulation of hL from zero. The accumulation of hL continues until the end of line v=0. The frequency of repetition of the accumulation of hL depends on the value of L. The start phase of the accumulation depends on N.

At the end of line v=0, the selectors SEL2 and 3 select N and preload register REG again with N which is fedback to the adder 121. If desired, selector SEL1 selects M which is added to N in the adder and stored in the register REG and output and fedback to the adder 121 and also to the now enabled feedback register 125 where N+M is stored. The selector SEL1 now selects L and N+M+HL is accumulated until the register REG reaches its maximum value for the first time on line v=1. The register then rolls over to zero and hL is repeatedly accumulated along line v=1 as before. At the end of line v=1, the selector SEL2 selects N+M from the now enabled feedback register 125 and the register REG is preloaded with N+M via selector SEL3. N+M is output and fedback to the adder. Selector SEL1 selects M from register 123 and adder produces N+2M which is stored in register REG and output and fedback to the adder and to the now enabled feedback register 125 where it is stored. Thereafter N+2M +hL is accumulated as on the preceding lines. The process repeats on successive lines with the preload value in register REG incremented by M on each line. The effect of M is to shift the phase of the accumulation on each line by an amount dependent on M.

The ramp values R output by the register REG are used to address a look-up table in a ROM 130 of FIG. 13 to produce a sine modulation. Although the ROM could be arranged to store a whole sine cycle in this embodiment it stores only one quadrant of a sine wave to minimise the data stored. In this example the value R is an 11 bit twos complement number. The 9 less significant bits are used to address the ROM. The two most significant bits are used to indicate which quadrant is to be produced. Referring to FIG. 15A, four quadrants of a sine function are shown at a to d. Assuming MSBs 00 select quadrant a, then quadrant b (01) is produced by inverting the 9 bit address in inverter 133. Quadrant c (10) is produced by negating the sine function data in negater 134 and quadrant d (11) is produced by both inverting the address and negating the sine-function data.

Referring again to FIG. 13, the two MSBs of the 11 bit ramp signal R are fed to logic 132 to indicate which quadrant to produce. Logic 132 then produces a invert (negate) enable signal S, a 1-bit address invert enable signal I, and a 2-bit switch control signal for controlling a selector 136 according to the indicated quadrant. The 9 LSBs of the ramp signal R are fed to the ROM 130 via an address inverter 133 which either inverts the address or does not invert it according to the invert enable signal 1 from logic 132. The address from the inverter addresses the ROM 130 to produce the desired quadrant. The ROM output data is fed to the negater 134 which negates the sign or not according to the sign negate enable signals from the logic 132. The negater 134 is followed by a gain adjuster 135 which controls the amplitude of the modulation. The modulation is then added to the solid produced by ramp generator 80 in the adder 81 of FIG. 8 for example.

Referring to FIG. 15B, an example of a sine modulation is shown. This example is produced when N=0, and M=0. The frequency of the modulation is dependent on L. The sine repeats on each line with any phase shift relative to the beginning of each line as provided by N or relative to each preceding line as provided by M. FIG. 15C is an example for N=0 and L=0. The sine modulation is in the frame direction. FIG. 15D is an example for N=0 and L and M have non-zero values. The sine modulation is directed at an angle which is dependent on L and M. M produces an accumulative phase shift from line to line.

When the modulation of FIG. 15C is added to a solid, in this example a simple ramp, the result is as shown in FIG. 15E. The clip level intersects the modulated ramp along a line CL which is the projection of the modulation onto the clip level plane. The modulation applies to only one edge. If several edges of a solid are to be modulated, each ramp forming the solid requires to be separately edge modulated before the ramps are combined.

Referring to FIGS. 13 and 14, edge modulation patterns other than sine functions may be produced. As shown in FIG. 14*e* to *h*, a triangular modulation may be produced simply by applying inversion and/or negation to the otherwise unmodified ramp signal R. As shown in FIG. 14*i* to *l*, a square wave may be produced by selectively negating and/or inverting the two MSBs of the ramp signal.

Referring to FIG. 13, these other modulation patterns are produced under the control of logic 132. The logic 132 decodes the quadrant selection to produce a 4 bit number representing decimal 0 to 15 as shown in FIG. 14 to choose the combination of negation, inversion and pattern type. The pattern selection signals are applied to a selector 136 to select the sine ROM 130, the ramp itself at input 137, or the square wave pattern produced by logic 138 from the two MSBs of the ramp signal. The edge modulator of FIG. 13 also has an input 139 for receiving pseudo-random numbers. The selector is controllable to select the input 139. The effect is an edge modulated by random 'noise'. The logic 132 may comprise a 16-bit register operating as a 4 by 4-bit look-up table. The register is programmable via a 16-bit input, to define various edge-modulation patterns.

Solid Modulation

FIG. 16 illustrates, in simplified form, one example of solid modulation. In this example a box solid 161, (formed by combining absoluted ramps as described above) is combined with the additive sum of two sinusoidal waveforms 162, 163 at right angles to each other. In the clip plane, the result will be approximately as shown at 164.

It will be appreciated that solid modulation differs from edge modulation in that it occurs after a plurality of ramps have been combined, and/or it uses a combination of two modulating waveforms.

Thus, solid modulation is modulating an entire solid (in contrast to just an edge) with a modulation waveform, which modulation waveform most preferably is itself a combination of two different waveforms.

In the example of FIG. 17, the solid modulation is generated by combining two waveforms generated by generators 170 and 171 as described with reference to FIGS. 13 and 14. The waveforms are combined by a combiner 172 as described with reference to FIGS. 10 and 11. The two waveforms which are combined may be any two of the types produceable by a generator of FIG. 13. For example a sine wave may be combined with a square wave. Those types are additionally variable in accordance with the values of the coefficients L, M and N. In addition the combiner 172 provides additive and non-additive combinations. Thus a very large number of different modulations can be produced.

Although FIG. 17 combines only two waveforms, more than two could be combined. The solid modulator may be additional to the edge modulator or may be provided instead of the edge modulator. Solid modulation may be applied to a solid which has no edge modulation or to a solid which has edge modulation.

Figure 18:
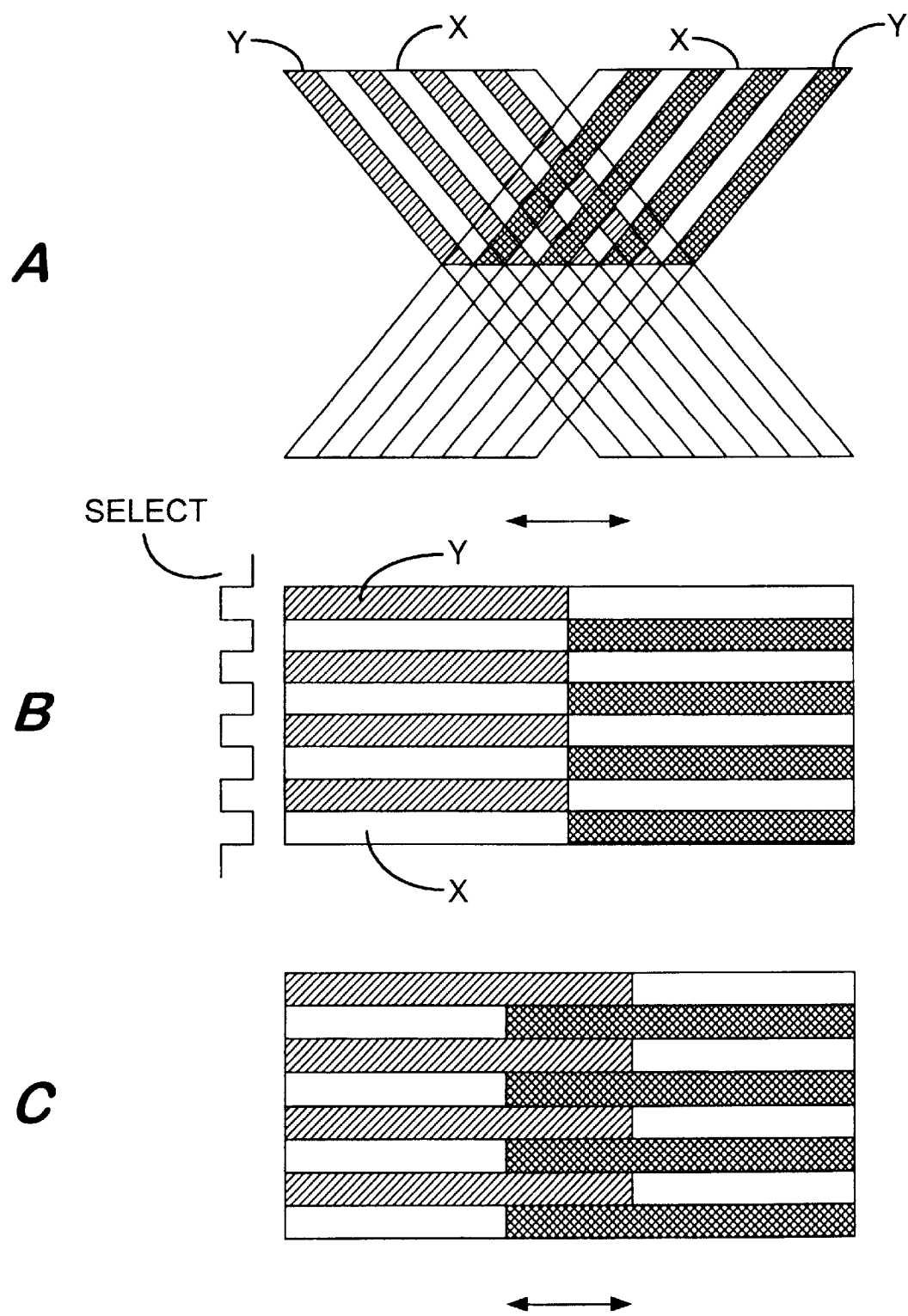
FIG. 18 comprises schematic diagrams explaining pairing.

Pairing Referring by way of example to FIGS. 18A to C two solids, in this case simple ramps as shown in FIG. 18A, are each in the form of spaced 'slats'. The hatched slats represent one video source Y which replaces another X which is represented by the blank slats. The slats of one solid are complementary to the slats of the other as shown in FIG. 18B. Such slatted solids are termed "paired solids". The two solids can be merged as shown in FIG. 18C or alternatively, as the clip level moves down, increasingly the complementary slats merge into one another. The simple ramps of FIG. 18 are only an example and complex solids can be formed by combining slatted ramps.

Figure 19:
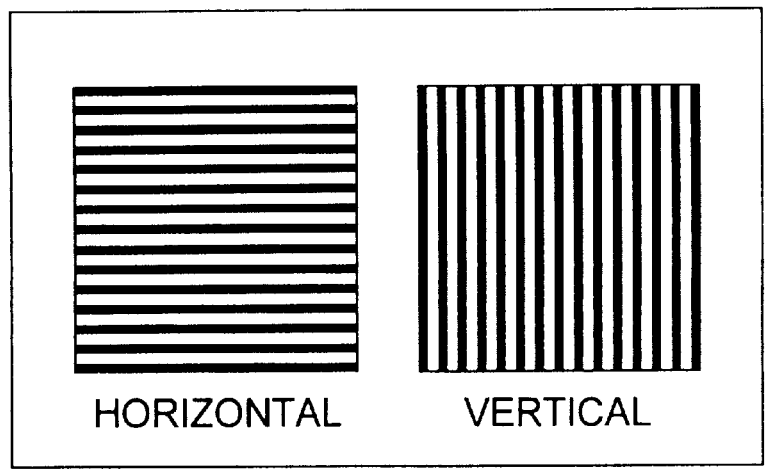
FIG. 19 shows vertical and horizontal slats.

Referring to FIG. 18A, a pair of ramps are produced. In the example of FIG. 18A, one ramp is the inverse of the other but in general the ramps may be unrelated. Spaced slats are selected from one ramp and intervening slats are selected from the other by a selection waveform as shown at the left hand side of FIG. 18B. The slats of FIG. 18 are horizontal. The slats may be vertical or horizontal as shown in FIG. 19.

Figure 20:
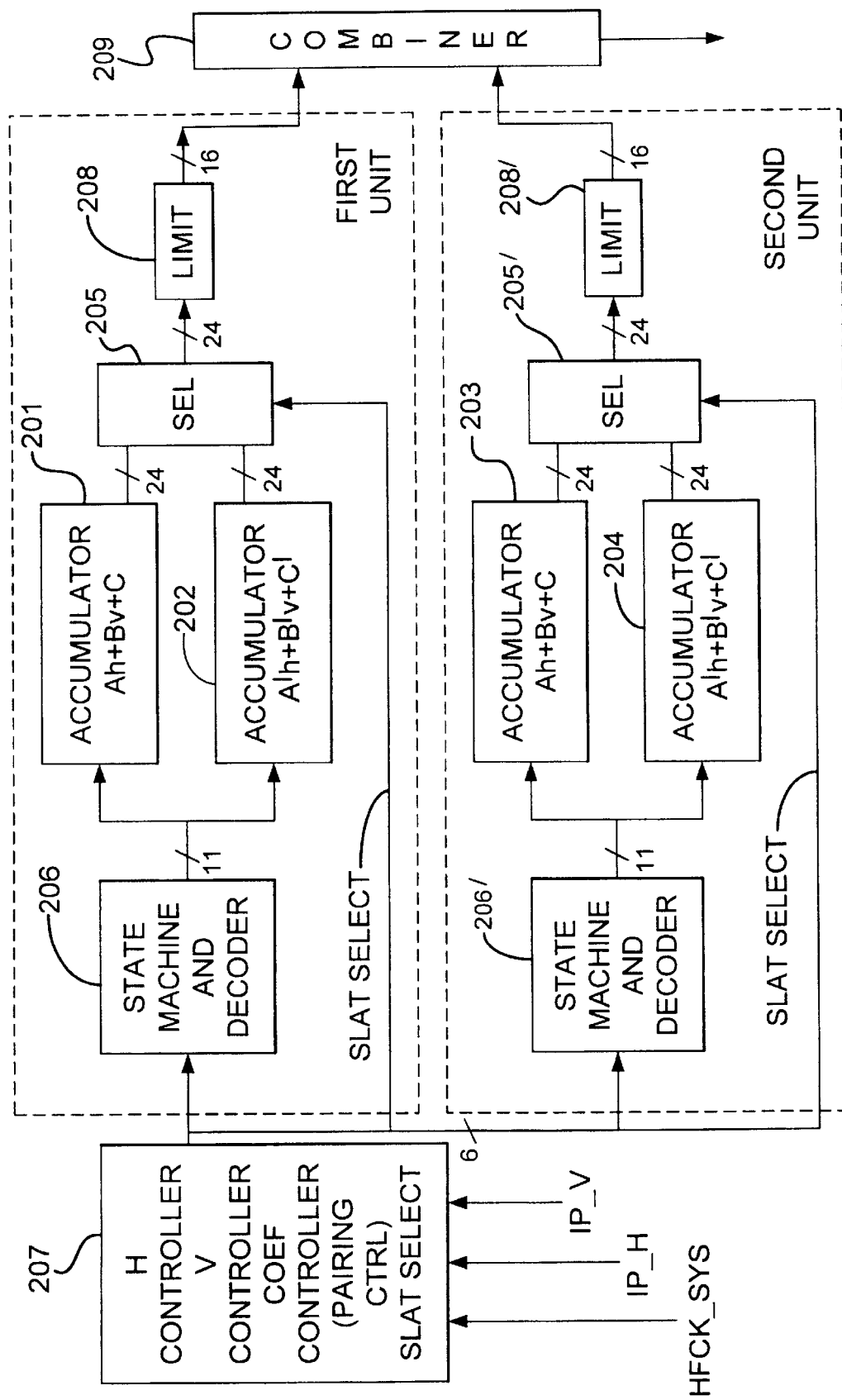
FIG. 20 is a schematic block diagram of a pairing generator.

Referring to FIG. 20, a schematic block diagram of circuit for producing paired ramps is shown. The circuit comprises first and second ramp generations units. The first unit comprises a first and second ramp generators 201 and 202. The second unit also comprises first and second ramp generators 203 and 204. Each ramp generator 201 to 204 is, for example, as shown in and described with reference to FIG. 5. The first unit is the same as the second unit and only the first unit will be described in detail. The first unit comprises a selector 205 which is controlled by the slat selection waveform to select the outputs of the first and second ramp generators 201 and 202 alternately. The ramp generators 201 and 202 may produce ramps as shown in for example FIG. 18A in which one is the inverse of the other but more generally may produce independent ramps. Usually the ramps are related in some way. For example one may be the inverse or reflection of the other. In general the ramps need not be related. The ramps produced by the generators are defined by the coefficients A, B and C fed to them by a state machine and decoder 206 which is controlled by a controller 207. The ramps may be limited by a limiter 208.

Figure 21:
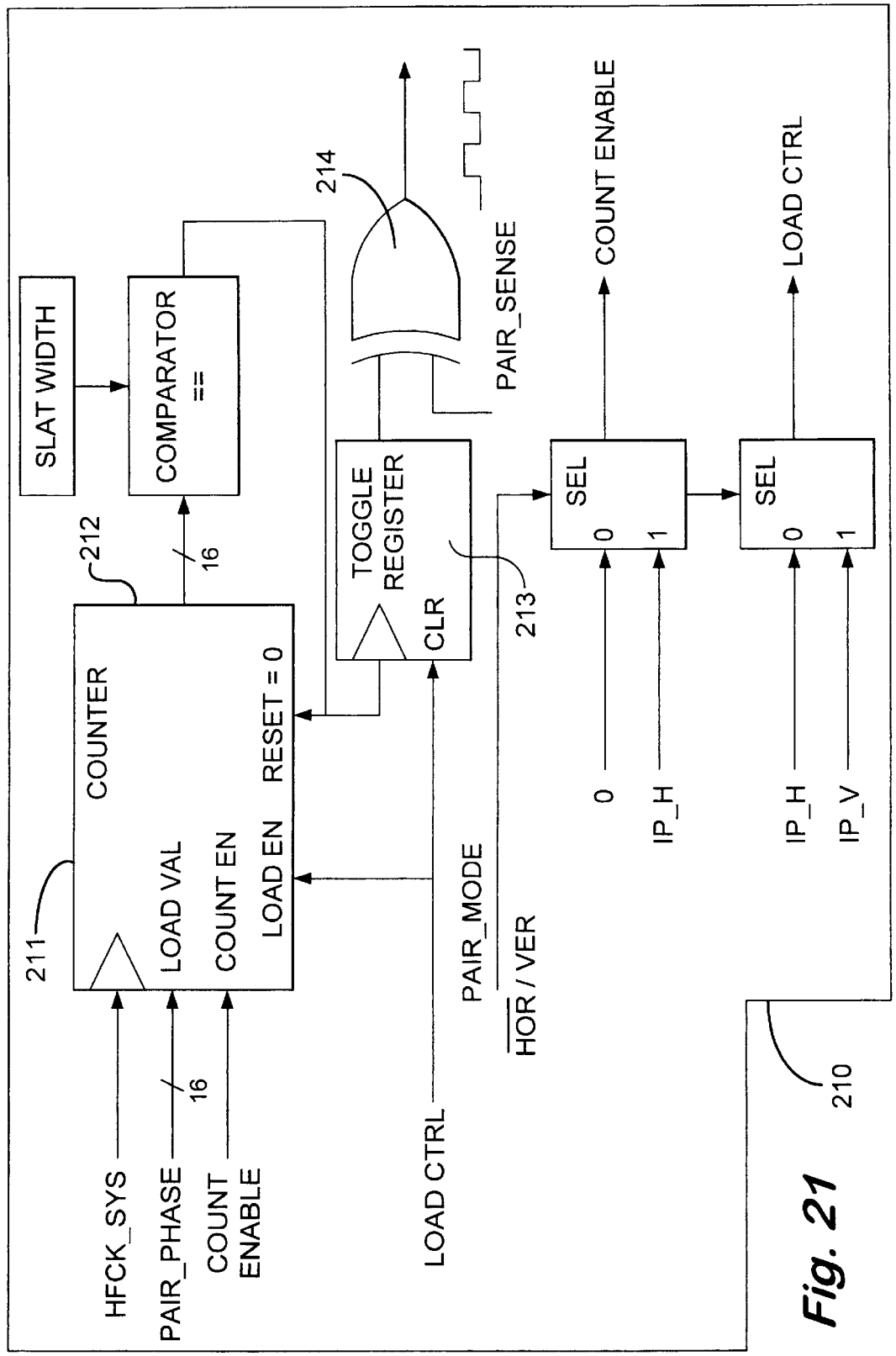
FIG. 21 is a schematic block diagram of a control signal generator of the pairing generator of FIG. 20.

The slat selection signal is produced by a generator 210 shown in FIG. 21 and which is part of the controller 207. The generator 210 produces a square wave which defines the width of the slats and the position of the slats in the frame. The square wave may select horizontal or vertical slats. For ease of explanation, production of vertical slats will be discussed. The square wave is produced by a counter which counts the HFCK_SYS pulses which occur at the pixel rate. The output count of the counter is compared in a comparator 212 with a count representing a reference width set by the controller 207. When the counts are equal the counter is reset to zero. At the occurrence of each reset, the state '0' or '1' of a bistable 213 (toggle register) is inverted to produce the square wave. The start phase of the count may be set by preloading the counter with a count PAIR_PHASE when a load enable pulse loadEn is provided. This enables the first edge of the first slat to be positioned with respect to the beginning of the line. The state of the bistable 213 is reset to a predetermined state each time the load enable signal is produced to ensure that the sense of the square wave is known at the beginning of every line. The sense of the square wave may be inverted by a PAIR_SENSE signal combined with the square wave in an EX-OR gate 214.

In order to produce horizontal slats, the counter counts the line pulses IP_H. Otherwise the operation is the same. The start-phase of the slats is set by the preloaded count PAIR_PHASE. Thus can be used to allow the slats to be centralised with different video standards such as 625/50 and 525/60.

By providing at least two units which are all subject to the same slat selection signals, a first complex solid can be produced by combining the first ramps produced by the units and a second complex solid can be produced by combining the second ramps produced by the units. The ramps may be combined using ramp combiners 209 as shown in FIGS. 9, 10 and 11. A solid produced by a ramp combiner from the first ramps is thus paired with another solid produced by another ramp combiner from the second ramps.

Mask Generator

Figure 22:
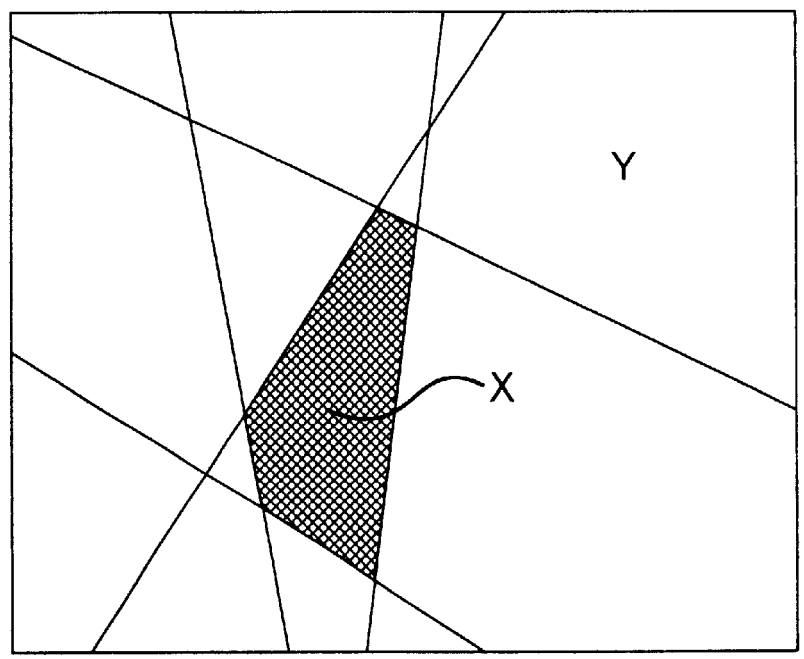
FIG. 22 is a diagram illustrating the use of the generator of FIG. 23.

Referring to FIG. 22, in accordance with this embodiment of the invention, it is desired to mask an arbitrary area X within a frame, the area X being surrounded by area Y. A plurality of ramps are combined by Non-Additive Mixing (NAM) to produce an arbitrary shape for the mask area X. All internal angles of intersections of lines defining the boundary are less than 180°.

The area X may contain an image feature which should not be visible in the final image. For example the area X may contain the image of a microphone or some other piece of production apparatus. The video in area X may be replaced by video from another source to hide the undesired image feature. Alternatively, the arbitrary masking may be used to produce wipe patterns which are not otherwise provided.

Figure 23:
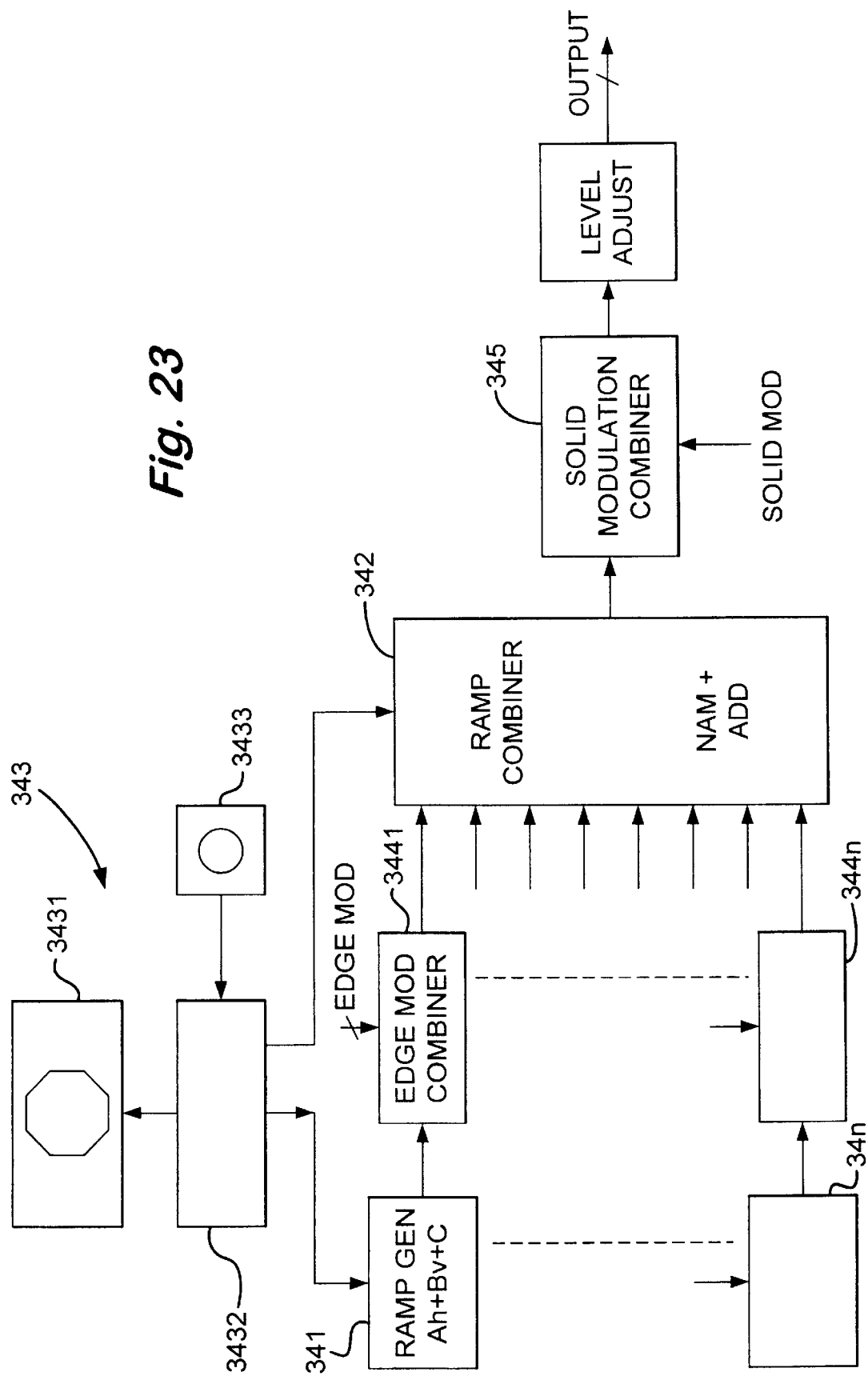
FIG. 23 is a schematic block diagram of a mask generator according to an embodiment of the invention.
Figure 24:
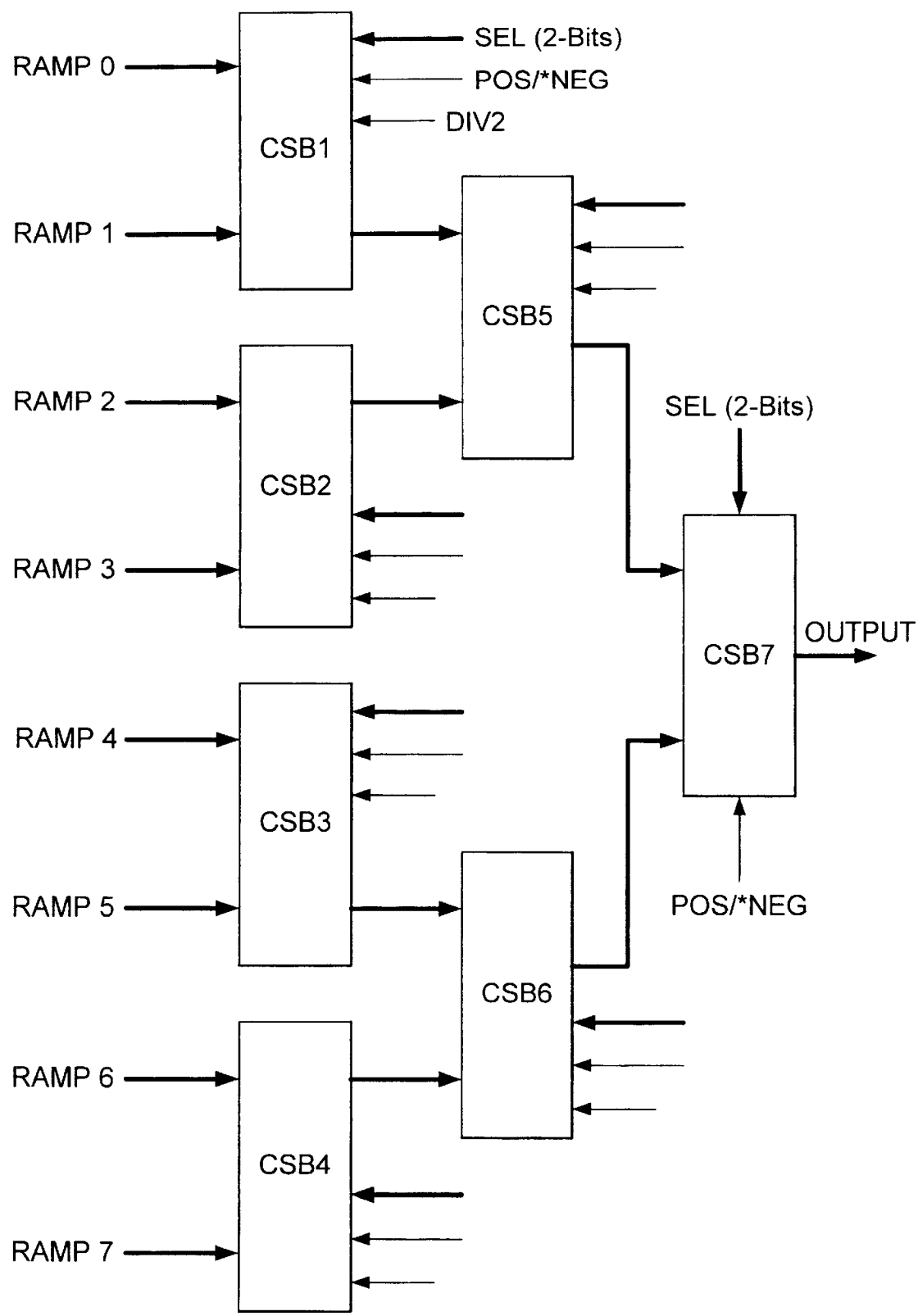
FIG. 24 is a schematic block diagram of a combiner of the generator of FIG. 23.

Referring to FIG. 23, a mask generator comprises a plurality of ramp generators 34*l* to 34*n* connected to a ramp combiner 342. In this example there are 8 ramp generators but there may be fewer or more. Each ramp generator is as shown in and described with reference to FIG. 5 or FIG. 39. The ramp generators are controlled by a controller 343 to produce ramps which define the mask area X. The ramp combiner is shown in FIG. 24. The combiner is also controlled by the controller 343. It comprises a plurality of combining stages CSB1 to CSB7. Each combining stage is as shown in and described with reference to FIGS. 10 and 11. Referring to FIG. 10, two ramps A and B may be combined by NAM 99, added 97, or simply one or the other may be selected by the selector 96 and delivered to the output unmodified. By control of the selector 96 the pairs of ramps delivered to the stages CSB may be selected and combined in desired combinations. The ramps which are selected in the combiner 342 are Non-Additively Mixed to produce the desired mask area X.

As discussed herein above, the ramps are defined by $R=Ah+Bv+C.$

The coefficients A, B, and C define the slope, orientation and position of the ramp.

The controller 343 comprises a display device 3431, a processor 3432 such as a computer, and an input device 3433. In this example, the input device 3433 comprises a pointing device such as a mouse, track ball or tablet, and may include, additionally or alternatively, a keyboard.

The controller 343 is set up to define preset regular polygons of 3 to 8 sides assuming there are eight ramp generators. More generally, if there are n ramp generators the controller is set up to define polygons of 3 to n sides. The operator chooses a preset polygon with a chosen number of sides using the input device 3433.

The vertices of the polygon are individually selectable. In this example, the operator chooses a vertex and, using a pointing device, drags it to a desired position. The operator repeats that for as many vertices as necessary to produce the desired shape for the marks area X. Such operations are well known in graphics programs.

The ramps produced by the ramp generators 34*l* to 34*n* can be made to have identical slope and a fixed clip level is defined. The processor 3432 calculates, from the co-ordinates of the vertices of the desired mask area X, the coefficients A, B and C of each ramp to produce ramps which intersect the clip plane with the desired co-ordinates.

If less than eight ramps are required, the combiner is controlled by the processor to select, using the control signals SEL2, the ramps which produce the desired mask area. The selection is predefined with the predefined polygons.

Each ramp may be edge modulated by an edge modulator 344 which is as described with reference to FIGS. 12 to 15.

The solid produced by the combiner 342 may be solid modulated by a solid modulator 345 as described with reference to FIGS. 16 and 17.

Figure 25:
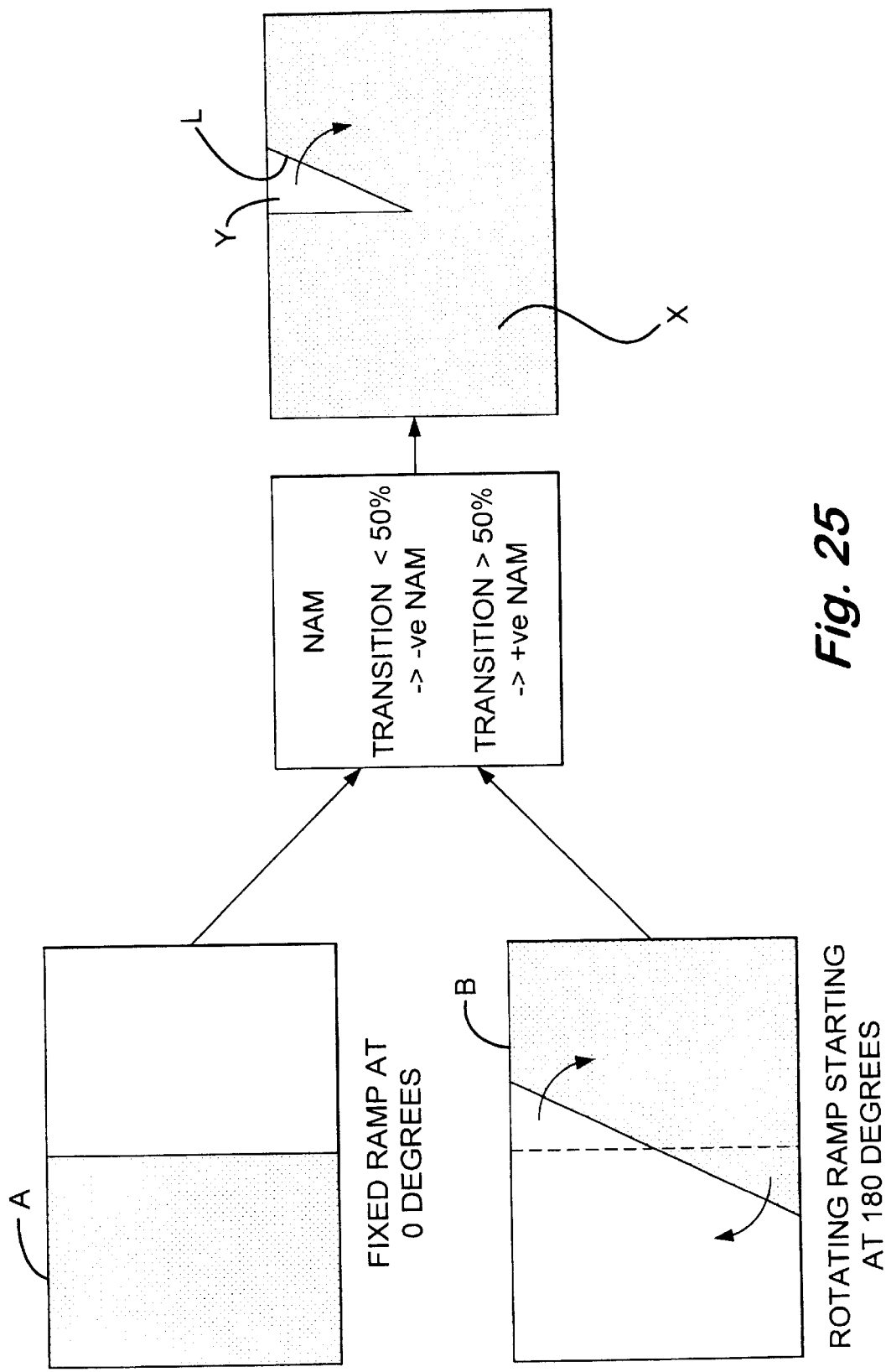
FIG. 25 is a diagram illustrating the use of a rotary wipe generator of FIG. 26.

Clock Wipe Referring to FIG. 25, it is desired to produce a wipe pattern which rotates, hence the term 'clock wipe'. A variety of patterns can be produced, some of which will be described herein. All the patterns use two or more ramps which have the same slope. The ramps bisect at a fixed clip level.

Firstly, for ease of explanation, a simple clock wipe using one fixed ramp A and one rotating ramp B will be described. In FIG. 25, two ramps A and B are provided with the same magnitude of slope but one ramp A slopes in the opposite direction to the other B. One A of the ramps is fixed, whilst the other B rotates. The effect is that a frame of video X shown black in FIG. 25 is replaced by a segment of video Y which continually increases as its leading edge L rotates. To produce this effect, the ramps A and B are Non-Additively Mixed. This is described in more detail with reference to FIGS. 25 and 26A to D. As discussed above, a NAM has the following truth table:

| Comparison Of Ramps | POS/NEG | Output Of NAM |
|---|---|---|
| A > B | POS | A |
| B > A | POS | B |
| A > B | NEG | B |
| B > A | NEG | A |

For POS/NEG POS, the NAM outputs whichever of A and B is greater at any moment in time, i.e. at any pixel position. For POS/NEG NEG the NAM outputs whichever of A and B is smaller.

Referring to FIG. 26A, two oppositely sloping ramps A and B are shown. The ramps bisect at a fixed clip level. The ramps, when non-additively mixed, form a solid. Where the solid level is greater than the clip level CL, video Y is selected; where the solid level is less than the clip level CL, video X is selected. FIG. 26B shows a frame in which the two ramps are parallel with the edges of the frame and combined by the NAM in a negative combination NEG. Thus the solid is formed by the portions of the ramps below the clip level and the whole frame comprises video X. FIG. 26D shows the ramps combined in a positive combination POS so the portions of the ramps above the clip level are selected and the whole frame comprises video Y. Assuming the ramp B is rotated clockwise from the starting position of FIG. 26B, if the NAM is negative whilst the leading edge L is in the right hand half of the frame, then the segment of video Y is selected. The ramp B rotates until it is parallel with ramp A. The NAM then becomes positive. The segment of video Y then continues to replace X in the left hand half of the frame.

Figure 27:
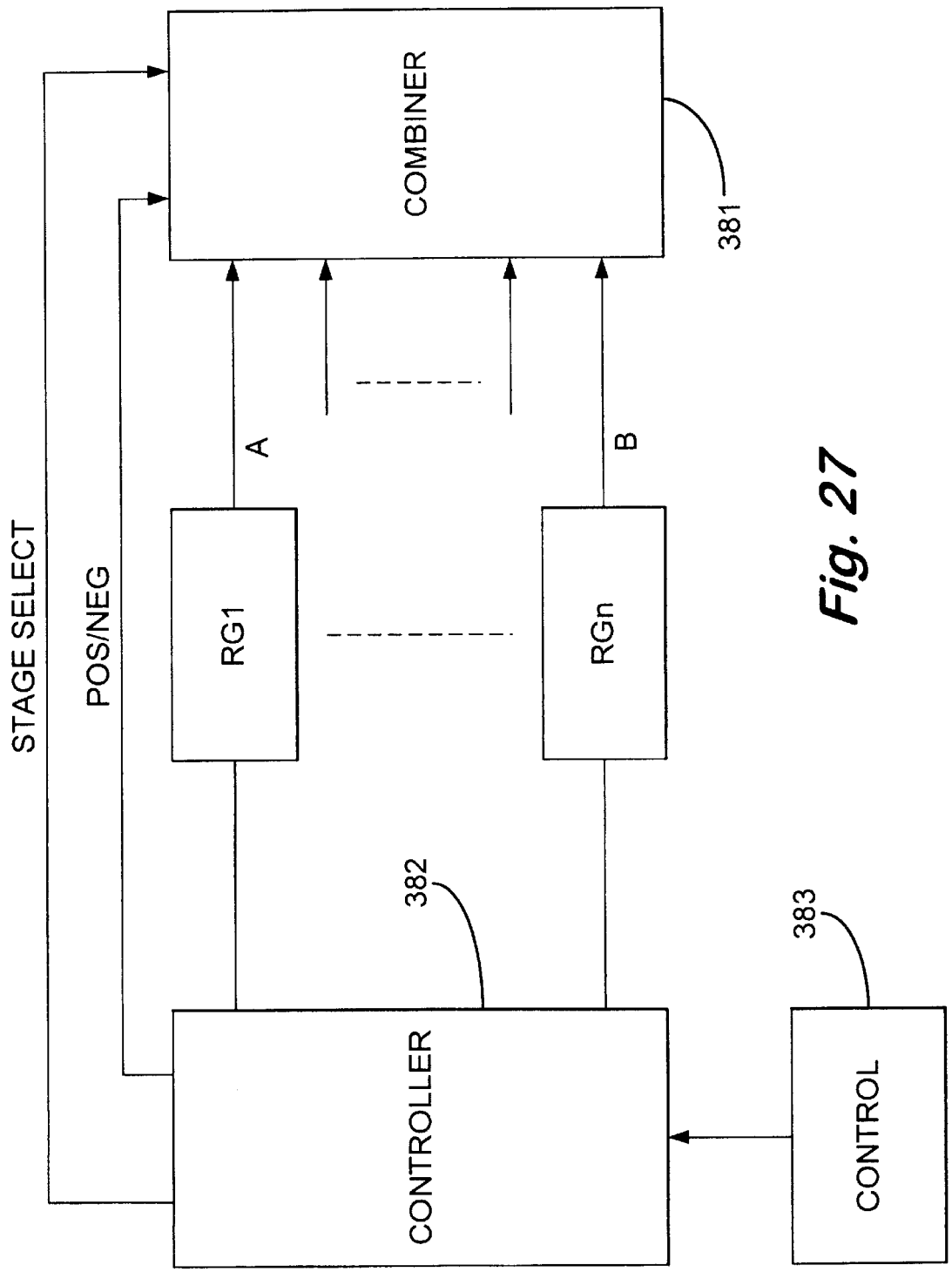
FIG. 27 is a schematic block diagram of a rotary wipe generator.

FIG. 27 is a schematic block diagram of a wipe generator for producing such a wipe pattern. The wipe generator of FIG. 27 may be, and preferably is, implemented using the wipe generator of FIG. 23. It comprises a plurality of ramp generators RG1 to RGn, where n is preferably 8, each as described with reference to FIG. 5 or FIG. 39, and a combiner 381 as described with reference to FIGS. 24, 10 and 11. A controller 382 defines many preset clock wipe patterns.

The patterns are defined by: the coefficients A, B and C of each ramp; the selection of ramps by the select signals SE2 applied to the combiner; and the control of the POS/NEG signals applied to the NAMs in the combiner. The rotation of a pattern is controlled by a rotation control 383 which may be a linear potentiometer.

Figure 26:
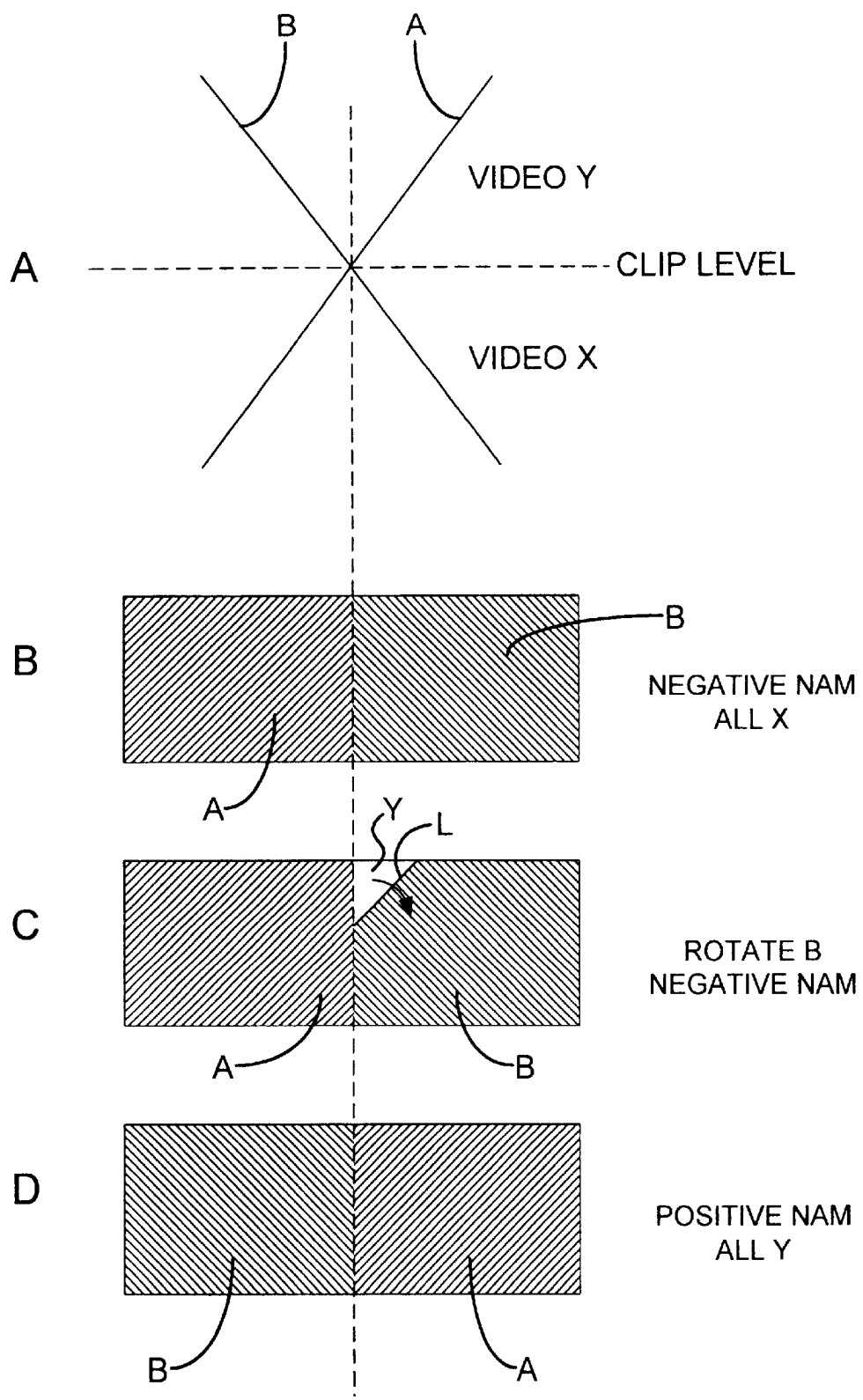
FIG. 26 is a diagram illustrating the aspects of a rotary wipe.

For the wipe pattern of FIGS. 25 and 26, two ramp generators are selected to produce the ramps A and B. The controller 382 generates the fixed coefficients of ramp A and controls the combiner 381 to route the ramps A and B through the combiner to be combined in a NAM.

The controller 382 produces POS/NEG control signals to control the individual NAM signals to be positive or negative NAM stages. The controller 382 produces stage selector signals to cause a selected stage to act as a NAM stage or to simply route signals unchanged. The controller 382 may produce at least the stage select signals in dependence upon position of the wipe in a frame; however that is not preferred currently.

Ramp B has varying coefficients A and B. Coefficient C may be varied. The rotation control 383 controls the rotation of the wipe. The position of the rotation control directly represents wipe angle. The relationship between the position of the rotation control and the rotation angle is dependent on the pattern and is preset by the controller 382. The controller calculates the coefficients A and B and C of the ramp B which place the ramp at the desired angle. A wipe angle of 180° also indicates the point in the wipe at which the NAM function changes from Negative to Positive.

FIGS. 28A to E show some, out of may possible examples, of preset rotary wipe patterns, together with the configurations of the combiner of FIG. 35 needed to implement the patterns, and the ramps at the starting points of the wipes. In the Figures F denotes a fixed ramp and R denotes a rotating ramp, and CL denotes the fixed clip level.

In FIG. 28A two oppositely rotating ramps R1 and R2 wipe two halves of the frame from top to bottom.

The controller 382 selects combining stages CSB1, 2 and 5 and sets them to act as NAM stages, and also selects CSB7 (not shown) to simply route the output of CSB5.

CSB1 and 2 are set as negative NAM stages and CSB 5 is set as a positive NAM stage. CSB1 receives at its inputs the fixed and rotating ramps F1 and R1 having the starting position shown. CSB2 receives at its inputs the fixed and rotating ramps F2 and R2 having the starting positions shown.

Figure 28B:
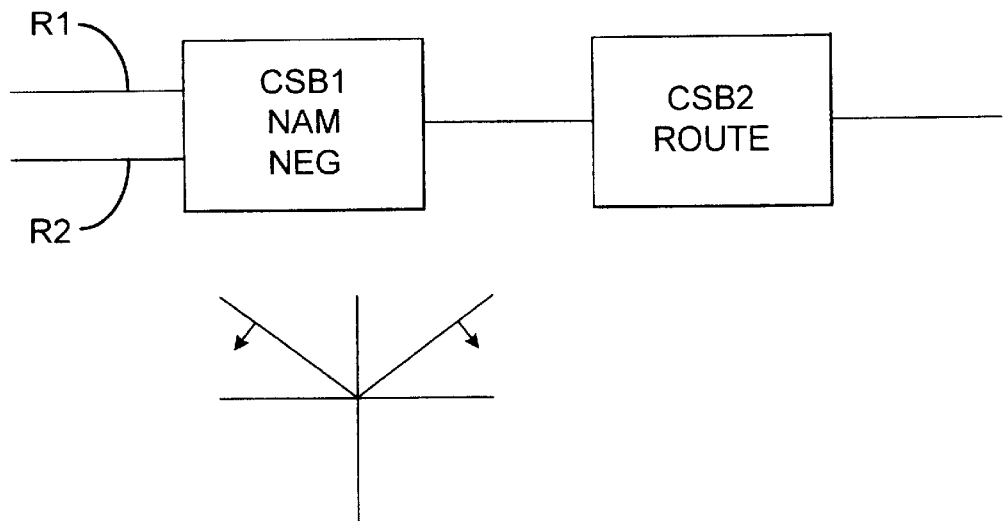

An alternative way of generating the pattern of FIG. 28A is to use two ramps R1 and R2 and rotate R1 oppositely to F2 and negatively NAM them, as shown in FIG. 28B.

Referring to FIG. 28C, a wipe pattern comprises two radially opposite lines rotating in the same sense (clockwise in FIG. 28C). The controller 382 configures the combiner 381 to comprise stages CSB1, 2, 5 and 7. Stage CSB1 is set as a negative NAM, and stage CSB2 is set as a positive NAM. Stage CSB5 selects the output of CSB2 in the left half of the frame and CSB1 in the right half of the frame.

CSB7 (not shown) simply routes the output of stage CSB5.

Stage CSB1, which generates the wipe pattern of the right half of the frame, receives fixed ramp F1A and rotating ramp R1 having the shown starting positions from respective generators RG1, RG2 for example. Stage CSB2, which generates the wipe pattern of the left half of the frame, receives fixed ramp F1B and rotating ramp R2 from respective generators RG3 and RG4 for example. The ramps R2 and F1B have the starting positions shown.

Figure 28D:
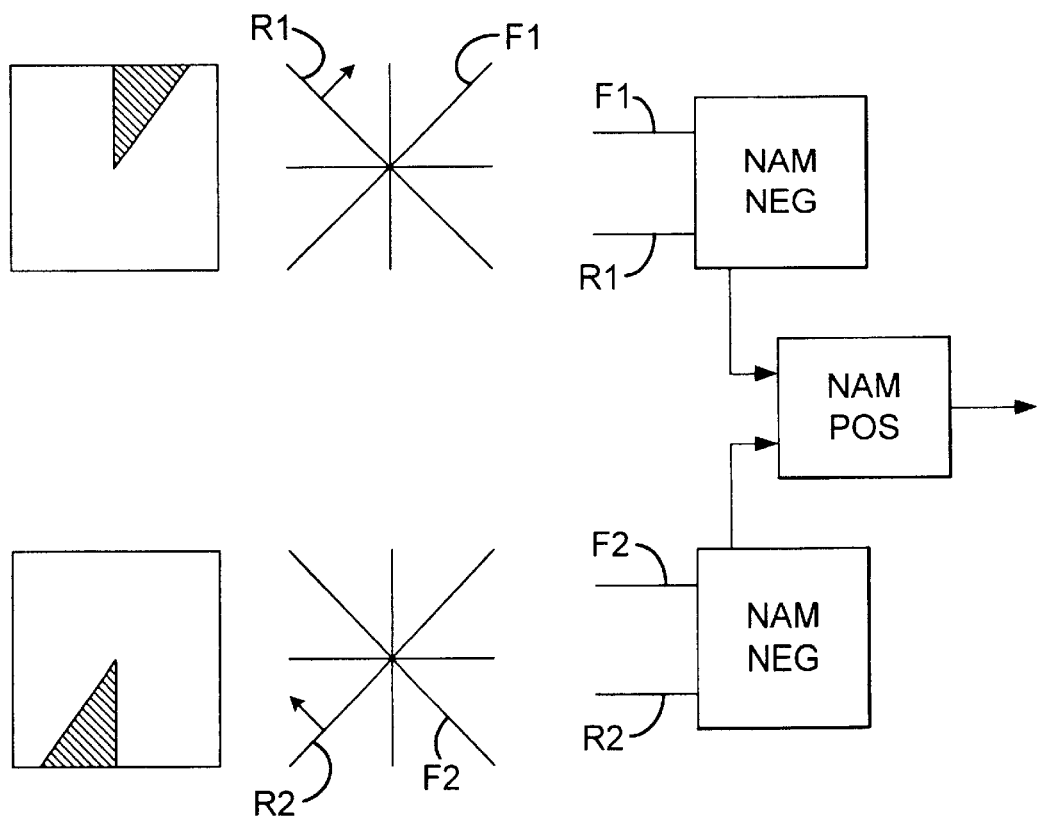

The controller produces a selection signal SEL which is applied to the stage CSB5 which acts as a selector. On each line, the selector CSB5 selects the output of CSB2 in the left half of the frame, and the output of CSB1 in the right half of the frame. The selector signal selects horizontally. Other patterns can be created by selecting upper and lower halves of the frame, using a vertical selection signal. It is possible to select quadrants of a frame using both horizontal and vertical. However, selection of halves or quadrants of a frame is not preferred. FIG. 28D illustrates a preferred alternative to FIG. 28C which avoids selecting quadrants. Instead of selecting quadrants, the rotating ramps are generated by control of the ramp coefficients A, B and C such that each ramp rotates over a particular range of rotation, the ramps having different starting positions.

Thus, referring to FIG. 28D, to generate a wipe comprising two radially opposite lines rotating in the same sense, two negative NAM stages receive a fixed ramp F1, F2 respectively and rotating ramps R1, R2 respectively where $R2(\theta)=R1(\theta+\pi)$ and $F2(\phi)=F1(\phi+\pi)$ where $\theta$=angle of rotation of ramp R1, and $\phi$ is the fixed position of F1. The starting positions are shown schematically in FIG. 28D. A positive NAM stage NAMs the output of the two negative NAM stages to produce the wipe pattern.

Figure 28E:
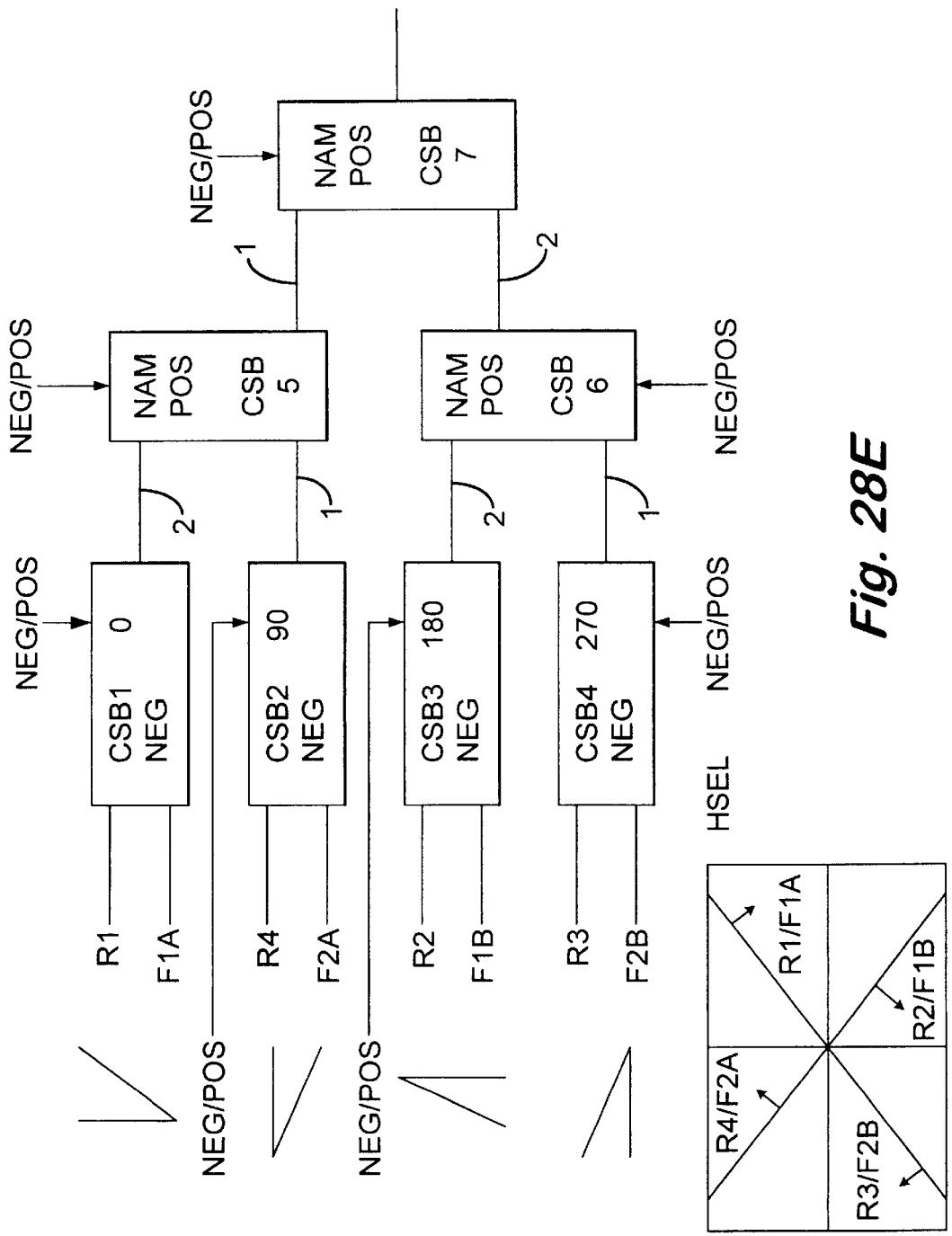

FIG. 28E illustrate a wipe pattern having four rotating ramps R1 to R4 each of which wipes a quadrant of the frame. The controller 382 configures all of the stages CSB1 to 7 of the combiner 381. Stages CSB 1 and 3 are set as negative NAM stages and stages CSB 2 and 4 are set as positive NAM stages. Stages CSB5 and 6 are horizontal selectors and stage CSB7 is a vertical selector, as will be explained.

Stage CSB1 receives a rotating ramp R1 and a fixed ramp F1A which are the same as ramps R1 and F1 of FIGS. 28A and B. Stage CSB3 receives a rotating ramp R2 which his the same as R1 but rotated 90° and ramp F1B which is the same as ramp F1A.

Stage CSB4 receives a rotating ramp R3 and fixed ramp R2B which are the same as ramps R2 and F1B of FIG. 28B. Stage CSB3 receives a rotating ramp R4 which is the same as R3 but rotated 90° and a fixed ramp R2A which is the same as F2B.

The ramps R1 to R4, F1A, F1B, F2A and F2B are produced by respective ramp generators.

Edge modulation may be applied to the individual ramps, and solid modulation may be applied to the combined ramps.

Multiple Generator

FIGS. 29 to 33, 36, 37 and 39 illustrate examples of multiple identical solids arranged in an array in a frame. Each solid occupies a square herein also referred to as a tile. A wipe occurs simultaneously within each tile until the whole frame is wiped. For ease of explanation it is initially assumed that each tile of the array comprises a solid in the form of a single ramp $$R=Ah+Bv+C$$

where v is line number v=0 ... m and h is pixel number h=0 ... n as described with reference to FIGS. 4 and 5. Also it is assumed the values of and B are preset and are the same for all the tiles. As will be described the value of C depends on the position of the tiles in the array and in the frame. The values of A and B are for example equal to the values of the corresponding coefficient of a single ramp occupying the whole frame. The dynamic range of each ramp is the dynamic range of a corresponding ramp occupying the whole frame divided by the number of tiles in a frame.

There are two main modes of operation, referred to herein as "Non-Masking" mode and "Masking" mode. In the "Non-Masking" mode, a regular array of rectangular tiles occupy the whole frame. The array may be moved relative to the edges of the frame. In the "Masking" mode the tiles also occupy the whole frame, but edge tiles are extended or reduced relative to other tiles if the array is moved relative to the frame.

Non-Masking Mode

Referring to FIG. 29, there is shown by way of example a regular 4 by 4 array of tiles coincident with the frame and containing identical ramps R=Ah +Bv+C. The ramp in the top left tile starts at the beginning of the first line active v=0 as defined by signal IP__V, IP__H and accumulates as Ah in the horizontal direction until a horizontal tile end pulse HTE occurs. The ramp is reset by HTE and begins again for the next tile at the occurrence of a horizontal tile start signal HTS. At the next line the process repeats with the line start value incremented by Bv where v=1. The process repeats for the remaining lines of the first row of tiles until a vertical tile end pulse VTE occurs whereupon the value C+Bv is reset to its start value C=0. The signal VTE maintains its end of tile value for a whole video line. The process repeats for the next row of tiles at the occurrence of a vertical tile start signal VTS.

Figure 30:
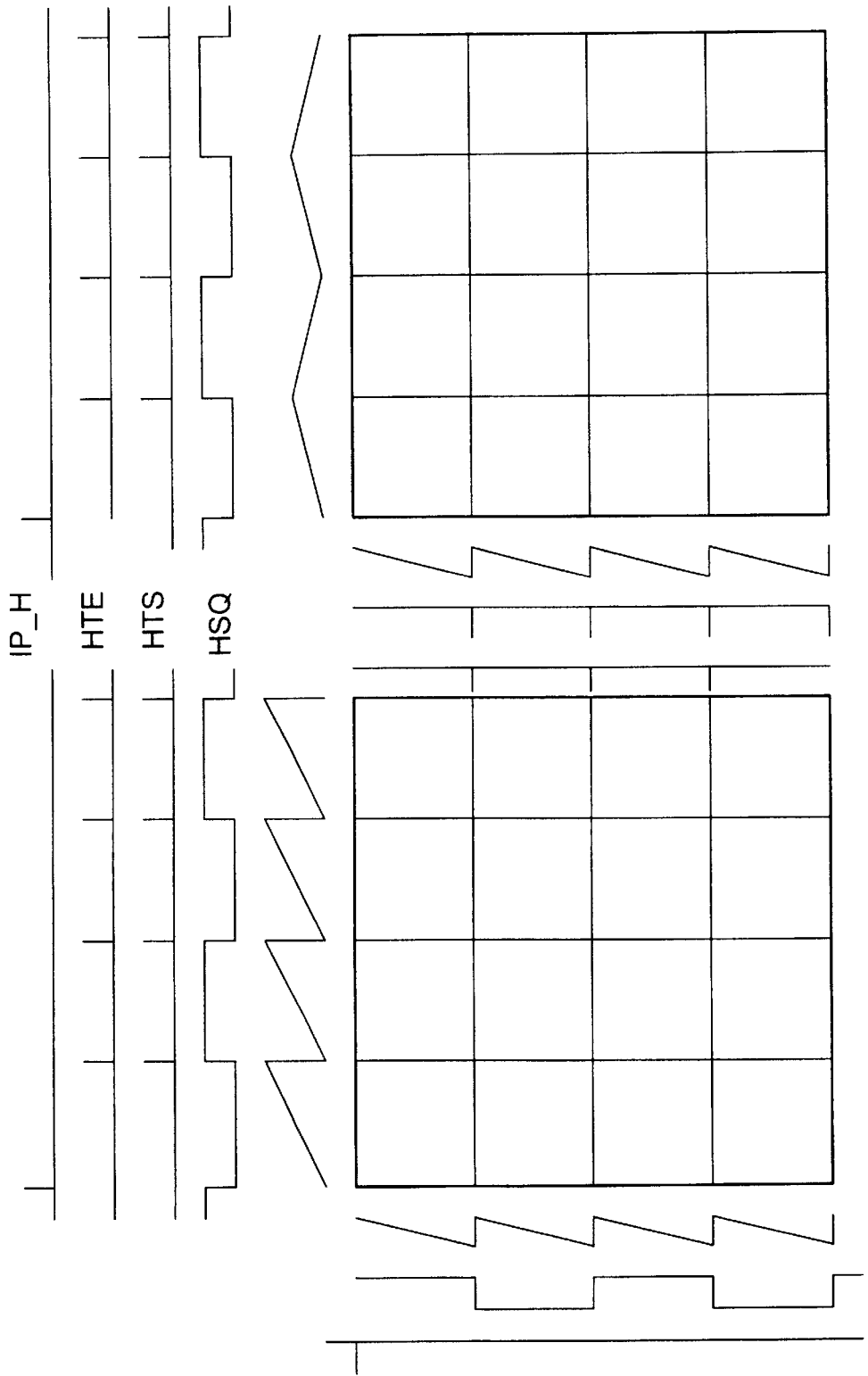
FIG. 30 shows other multiple, wipe patterns in a frame.

The array of FIG. 30 is the same as the array of FIG. 29 except that alternate horizontal tiles contain ramps inverted relative to the ramps of the other tiles. Thus a ramp accumulates from C=0 to a value FB1 in the first line of the top left tile and then decrements from FB1 to C=0 in the next tile. The inversion is controlled by a column select waveform HSQ which is a square wave having a half cycle of value '0' to select even numbered columns (0,2, ...) and at half cycle of value '1' to select odd numbered columns (1, 3, ...). FIG. 30 shows inversion only in the horizontal direction; inversion may occur in the vertical direction controlled by a row select signal VSQ which is similar to HSQ.

FIG. 31 shows an array of tiles similar to that of FIG. 29 but in which odd numbered rows are shifted horizontally relative to the even numbered rows. The Horizontal shift is implemented by selecting the odd numbered rows using a waveform VSQ and at the start of each line in those rows providing a start value Cshift for those rows such that each line begins as R=Ah+Bv+Cshift. In the presently preferred embodiments the shift is provided only in odd horizontal rows.

FIG. 32 shows an array of tiles similar to that of FIG. 29 but in which the whole array is subject to horizontal (Hphase) and vertical (Vphase) phase offsets relative to the frame. A horizontal phase offset or alternatively a vertical phase offset may be provided alone if desired. The horizontal phase offset is implemented by providing an initial phase offset value CHphase at the beginning of each line of every row of tiles. For a horizontal phase offset the ramp of an edge tile accumulates as Ah+Bv+CHphase horizontally assuming there is no vertical phase offset. The phase offset CHphase is thus applied only to the first tile in a row. The vertical phase offset is implemented by providing an initial phase offset value CVphase along the first line of the first row of tiles so that the ramp accumulates as Ah+Bv+CVphase vertically assuming there is no horizontal phase offset. Horizontally the ramp accumulates until the end of tile pulse HTE occurs. Likewise the ramp accumulates vertically until the end of tile pulse VTE occurs.

The horizontal phase offset differs from horizontal shift, in that the horizontal shift occurs only on selected (e.g. odd) rows relative to the edge of the frame, whereas the horizontal phase offset applies to intervening, (e.g. even) rows relative to the edges of the frame. The shift is preferably calculated as an overall phase offset relative to the edge of the frame for all rows plus (or minus) the shift of odd rows relative to even rows.

Although in principle such shift and offset could be applied to vertical columns, in the embodiments of the invention discussed herein it is applied only to horizontal rows. A uniform vertical phase offset is applied to all vertical columns.

Figure 33:
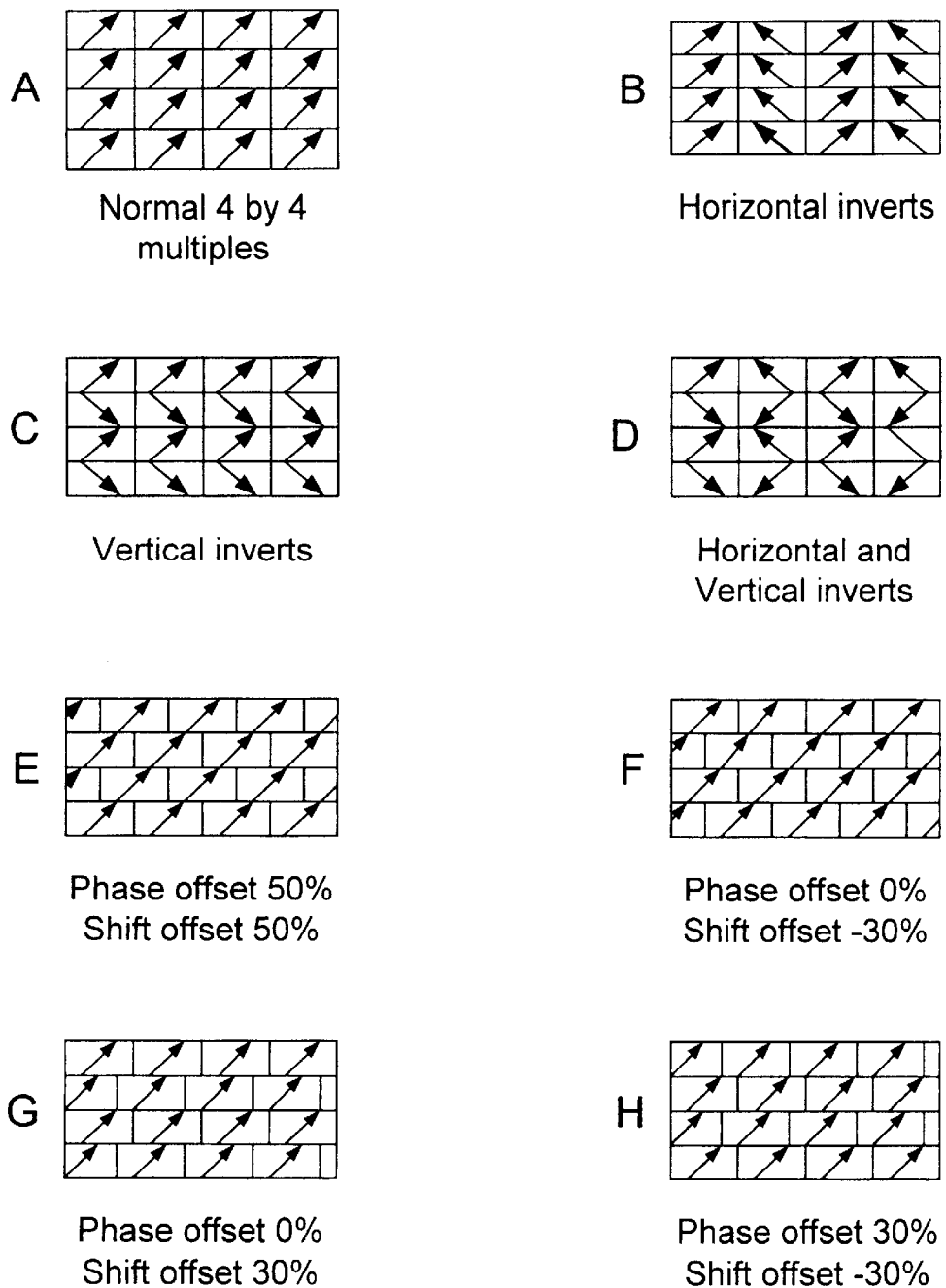
FIG. 33 shows other combinations of shift, phase shift and inversion of patterns.

FIG. 33 shows arrays of tiles having various combinations of shift, phase offset and inversion together with values of shift and offset. Each array comprises 4 by 4 tiles. FIG. 33 shows the values of shift and offset according to the following rules:
  a) shift left is positive;
  b) phase offset is applied to all rows equally;
  d) an additional shift may be applied to odd rows.

FIG. 33A is an array with no shift, no offset and no inversion. FIGS. 33B to D have no shift or offset. FIG. 33B is an array in which the ramps of odd numbered columns are inverted relative to those of even numbered columns. FIG. 33C is an array in which the ramps of odd numbered rows are inverted relative to those of even numbered rows. FIG. 33D is an array in which both odd numbered columns and odd numbered rows of ramps are inverted. FIG. 33E is an array which has no inversion but in which the even numbered rows are phase offset by ½ a tile width and the odd numbered rows have an additional shift of ½ a tile width. FIG. 33F is an array which has no inversion but in which the even numbered rows are phase offset by zero and the odd numbered rows have an additional shift of −⅓ of a tile width. FIG. 33G is an array which has no inversion but in which the even numbered rows are phase offset by zero and the odd numbered rows have a shift of ⅓ of a tile width. FIG. 33H is an array which has no inversion but in which the even numbered rows are phase offset by ⅓ of a tile width and the odd numbered rows have an additional shift of −⅓ of a tile.

FIGS. 34 and 35 are block diagrams of horizontal and vertical control signal generators which produce the signals HTS, HTE, HSQ, VTS, VTE and VSQ of FIGS. 29 to 32. Firstly, consider FIGS. 29 and 30 and the Non-masking mode. Referring to FIG. 34, the horizontal control signal generator comprises a selector 271 controlled by the vertical row select signal VSQ to select a phase offset value plus shift value (VSQ='1')for odd numbered rows and a phase offset value (VSQ='0') alone for even rows. (These values are down loaded from the computer interface 6 to controller 2 of FIG. 40 for example.) The selected value is loaded into an up/down counter 272 as a preload value. The preloading occurs at the occurrence of the pulse IP_H at the beginning of a line. The counter counts up or down as controlled by an up/down control. The counter counts the HFCK_SYS pulses, i.e. the pixels of a line. The count is compared in a comparator 273 with a preset count HtileWidth representing the desired horizontal width of a tile. When the count equals the desired count the comparator 273 produces a pulse HTE which indicates the end of a tile. The pulses HTE toggle a register 278 as input cntReset to produce the signal HSQ. The signal IP_H resets the register and thus HSQ at the beginning of each line. The pulses HTE also reset the counter 272 to zero as cntReset. A register 286 produces the pulses HTS shown in FIGS. 29 and 30. As shown in these Figures, the start of a tile at the left hand edge of the frame is defined by IP_H. HTS indicates the start of subsequent tiles. Register 286 is controlled by series connected selectors 287 and 288. Selector 287 responds to the IP_H pulse at the beginning of a line to cause register 286 to inhibit the production of an HTS pulse at the start of a line. Selector 288 responds to the subsequent HTE pulses to cause the register 286 to produce the subsequent HTS pulses.

FIG. 35 shows the vertical control signal generator. It comprises an up/down counter 281 which is preloaded with the vertical phase value which is downloaded from the computer interface 6 to controller 2 of FIG. 40 for example. (There is no preload of vertical shift because this embodiment does not provide for vertical shift.) The counter counts up and down as controlled by an up/down control negPhase. The counter 281 counts the lines as represented by the IP_H pulses. A comparator 282 compares the count with a vertical tile width value, downloaded by the computer interface 6 to the controller 2, in a register 294. When the count equals the tile width, a pulse VTE indicating the end of a tile is produced. The pulse VTE also resets the V counter 281 to zero as a signal cntReset. The pulse VTE is fed to a toggle register 293 to produce the signal VSQ indicating the odd and even rows of tiles. The toggle register is reset at the beginning of each frame by the pulse IP_V. The pulse VTE is fed to the En input of register 293 as signal [CntReset AND not IP_H AND not phase Reset].

The pulses VTS are produced by a register 285 which outputs HFCK_SYS pulses at times controlled by series connected selectors 286 and 287. The vertical start of tiles at the edge of the frame is defined by IP_V. VTS indicates the start of subsequent tiles. Selector 286 inhibits the production of a VTS pulse at the start of a frame. Subsequent VTS pulses are output in response to the VTE pulses applied to selector 287.

Referring to FIGS. 34 and 35, by preloading the horizontal counter 272 with a positive shift and phase offset values, the tiles are effectively shifted left. The maximum offset or shift value is one horizontal tile width, otherwise the comparator will misfunction. By varying the offset and shift values from zero to maximum, the tiles can be panned leftwards. By continually cycling the offset and shift values from zero to maximum, the tiles appear to continually pan left. By cycling the offset and shift value from maximum to zero, the tiles appear to pan rightwards. Similarly, the vertical phase offset value preloaded into the vertical counter

281 of FIG. 28 is used to shift the tiles up or down. The computer interface 6 and the controller 2 of FIG. 40 perform the preload of the offset and shift values once per frame.

It will be appreciated that appropriate offsets must also be applied to the ramp coefficients C so that the ramps are also shifted with the tiles.

Masking Mode

Referring to FIG. 36A there is shown an array of tiles in which the whole array of e.g. FIG. 29 as indicated by dotted boundary is shifted rightwards and down relative to the edges of the frame. FIG. 36B shows the same array indicated by the dotted boundary shifted leftwards and down. This mode of operation is referred to herein as 'masking' mode. In this mode, wipes occur in all the tiles and progress in the edge tiles to the edges of the frame. Referring to FIG. 34, even though the array is shifted rightwards, as shown in FIG. 36A, horizontal position of the edge tiles is defined by IP_H at the beginning of a line and subsequent tiles start with HTS. The horizontal position is defined by a preload value loaded into the counter 272 at the occurrence of the IP_H pulse. The up/down count control signal negPhase causes the counter to count down from the preload value to zero. The counter is reset in down count mode (negPhase) when the count H count is zero (Hcount =0) by the signal phaseReset. (Signal phaseReset equals (negPhase AND (Hcount=0)).) The occurrence of the signal phase Reset inhibits the production of the horizontal tile start signal HTS by selectors 288, 287 and register 286. After the occurrence of count zero, negPhase causes the counter to count up and its count is compared in the comparator 273 with the desired tile width to produce the tile end signal HTE as discussed above. The tile end HTE and the tile start HTS signals are then produced in the same way as in non-masking mode for the subsequent tiles.

Referring to FIG. 36B, the array of tiles may be shifted leftwards (i.e. appear to start at the left of the left hand edge of the frame) by preloading the counter 272 with a positive count and counting up. However the number of tile widths must be specified and counted as they are produced along each line. The tiles are numbered zero onwards to NUM: NUM=3 if there are 4 tiles horizontally. When the specified number NUM of tile widths minus 1 has been produced along each line resetting of the H counter 272 ceases. The final HTE pulse which would have defined the right hand edge of the tiles is masked by inhibiting cntReset (mask Error =0)

Thus referring to FIGS. 34 and 36B, the preload value is loaded by selector 271 into the Hcounter 272 upon the occurrence of IP_H. The counter 272 counts up and its count compared in comparator 273 with the value Htile Width which represents the width of a tile, to produce the pulse HTE signifying the end of the tile. Assuming there are a number of tiles NUM the signals HTS and HTE are produced in the same way as in the non-masking mode for the zeroth to NUM−1 tiles.

A counter 279 counts [CntReset OR phaseReset] pulses. Its count is compared in a comparator 280 with a number (NUM−1) stored in a register 290. If the count is less than (NUM−1) an output signal maskError='1'. Once the count equals (NUM−1) maskError='0' preventing the H counter 272 from being reset. As a result signal HTE is produced for the NUM−1 tile but no further signals HTE are produced to the right of the right-hand edge of that tile. Also because maskError=0, no further HTS pulses are produced by circuits 286, 287, 288.

The preceding description refers to the simple situation shown in FIG. 36.

As shown in FIG. 37, in the masking mode, the array may be shifted relative to the frame, and/or the rows may be shifted relative to each other. The possible combinations of shift of the array relative to the frame and of shift if rows relative to the other rows produces variable numbers of tiles per row. It is assumed that only horizontal rows can be shifted relative to other horizontal rows. The whole array may be shifted vertically. For ease of explanation FIG. 37 shows only horizontal shifts of the whole array and of rows relative to other rows.

Figure 37A:
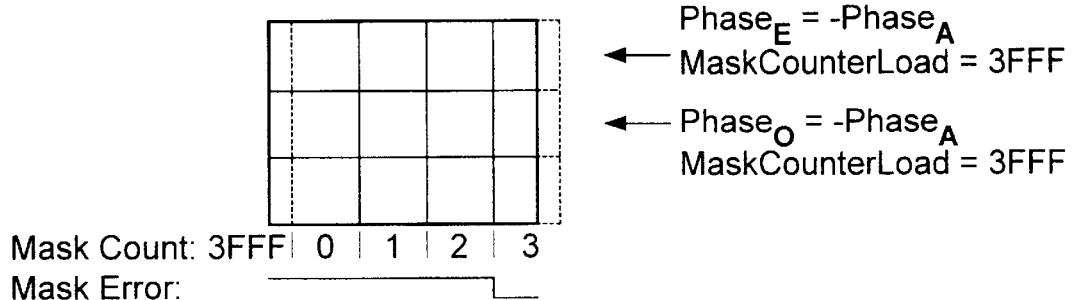
FIGS. 37A to F illustrate a variety of masking modes.

FIG. 37A shows an array in masking mode with even rows and even rows having the same rightwards phase shift -Phase$_A$. Referring to FIG. 34, a selector 283 controlled by the row selector signal VSQ produces a control signal MaskCtrl which is applied to a selector 289. Selector preloads the Mask Counter 279 with a value Hex 3FFF (−1) at the occurrence of IP_H at the beginning of each active line. Counter 279 counts phaseReset produced when H counter first counts down to zero at the point indicated by the dashed line at the left of FIG. 37A, setting the mask count to 0. Then the counter 279 counts CntReset pulses until the count= NUM−1=2. The signal maskError then becomes '0', inhibiting the producing of HTS pulses.

Figure 37B:
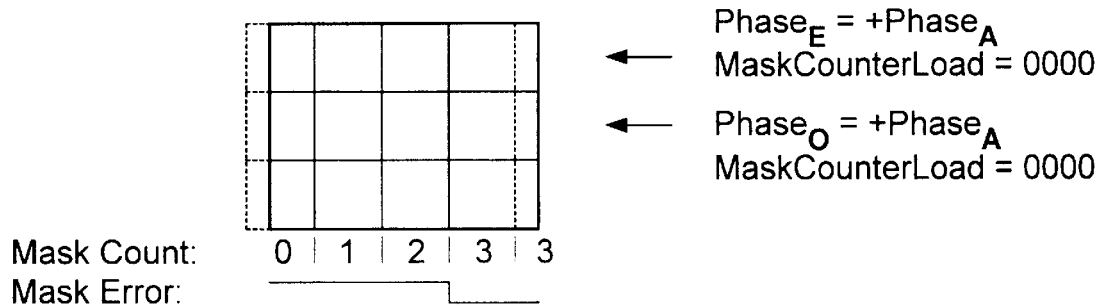

Referring to FIG. 37B, the array has the same leftwards shift+Phase$_A$ for all rows.

Selectors 283 and 289 preload the MaskCounter 279 with count zero (Hex 0000, LSB0) at IP_H. The Mask counter 279 counts cntReset pulses until its count is NUM−1 =2, wherein maskError becomes '0' inhibiting the production of HTS pulses.

Figure 37C:
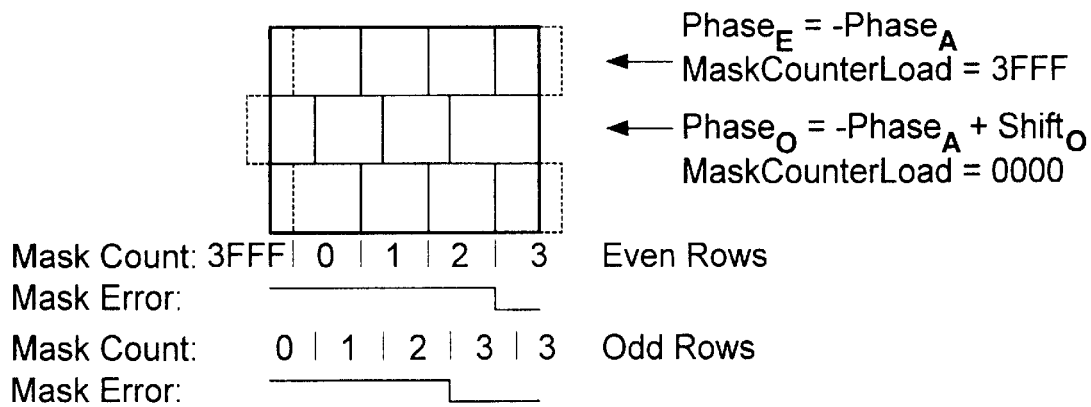

FIGS. 37C shows the situation in which even rows (0, 2, . . . ) are as shown in FIG. 37A, and odd rows (1,3) are as shown in FIG. 37B.

Figure 37D:
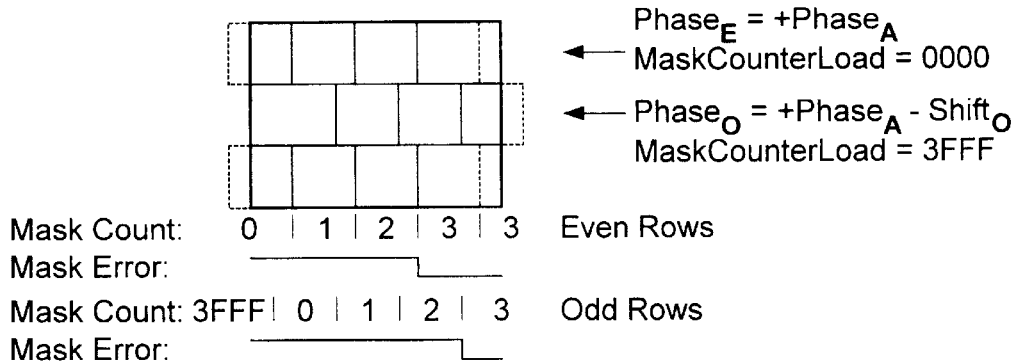

FIG. 37D shows the situation in which odd rows are as shown in FIG. 37A and even rows are as shown in FIG. 37B.

FIGS. 37A to D show situations in which the mask counter counts the same number of phaseReset OR cntReset pulses for both odd and even rows.

Figure 37E:
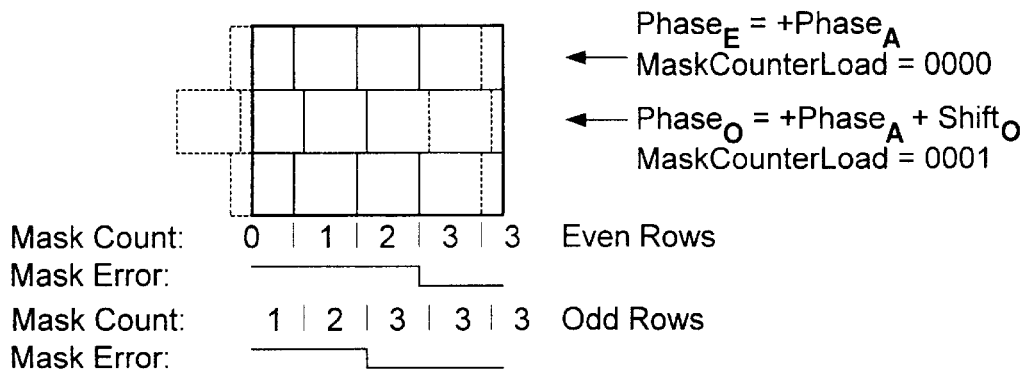

FIG. 37E shows a situation in which the odd row is shifted leftwards by +Shift$_0$ relative to the even rows, which are also shifted leftwards by+Phase$_A$. As a result the even rows have 4 tiles 0 to 3 but the odd row has only 3 tiles 1, 2, 3, the zeroth tile being shifted left of the frame edge. The even rows are controlled as described with reference to, for example, FIG. 37B, the counter being loaded with Hex0000, LSB0(0). For the odd row, the mask counter 279 is preloaded by selectors 283 and 289 with a count Hex 0000, LSB1 (+1). The signal maskError becomes zero at NUM− 1=2 inhibiting the production of further HTS pulses as described above. In general, the LSB of the mask counter load value is set to 1 if all tiles are moved left, even(all) rows are moved one fewer tile boundaries than odd row(s), the phase shift of even (all) rows is less than one tile width and the additional shift of odd rows is greater than one tile boundary.

Figure 37F:
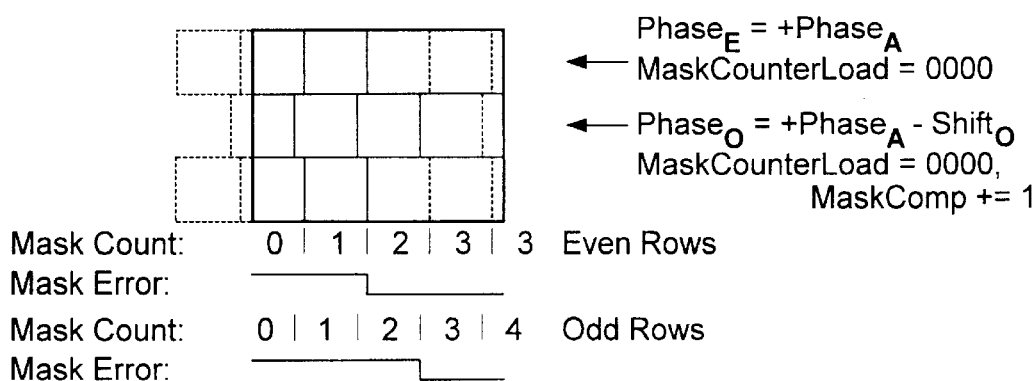

FIG. 37F shows the situation in which the even rows are shifted leftwards by +PhaseA and the odd row is additionally shifted rightwards by −Shift$_0$ relative to the even rows. The magnitudes of the shifts are such that the even rows have 3 tiles which cause 2 cntReset pulses to be produced, whilst the odd rows have 4 tiles which cause 3 cntReset pulses to be produced. In this example, the mask counter is preloaded with zero for all rows. However, an adder 299 is actuated for the odd row to add 1 to the reference count applied to the comparator 280. In general, the adder 299 adds 1 if all tilse are shifted left, even (all) rows are moved one more tile boundary than odd row(s), the phase shift of even (all) rows is greater than one tile width and the additional shift of odd row(s) is less than one tile width.

Whilst only 3 rows are shown in FIG. 37, more than 3 rows can be provided. Also, FIG. 37 shows shifting of all rows horizontally only. Vertical shifting of all rows can be provided. The vertical controller of FIG. 35 has a vertical mask counter 295, comparater 296 and a preload selector 297 corresponding to horizontal mask counter 279, comparator 280 and selector 289 of FIG. 34. The vertical controller operates similarly to the horizontal controller and will not be further described.

The vertical position of the array of tiles is similarly controlled in the vertical control signal generator of FIG. 35. Comparison of FIGS. 34 and 35 will show they are in principle identical and thus they will not be further described.

Figure 40B:
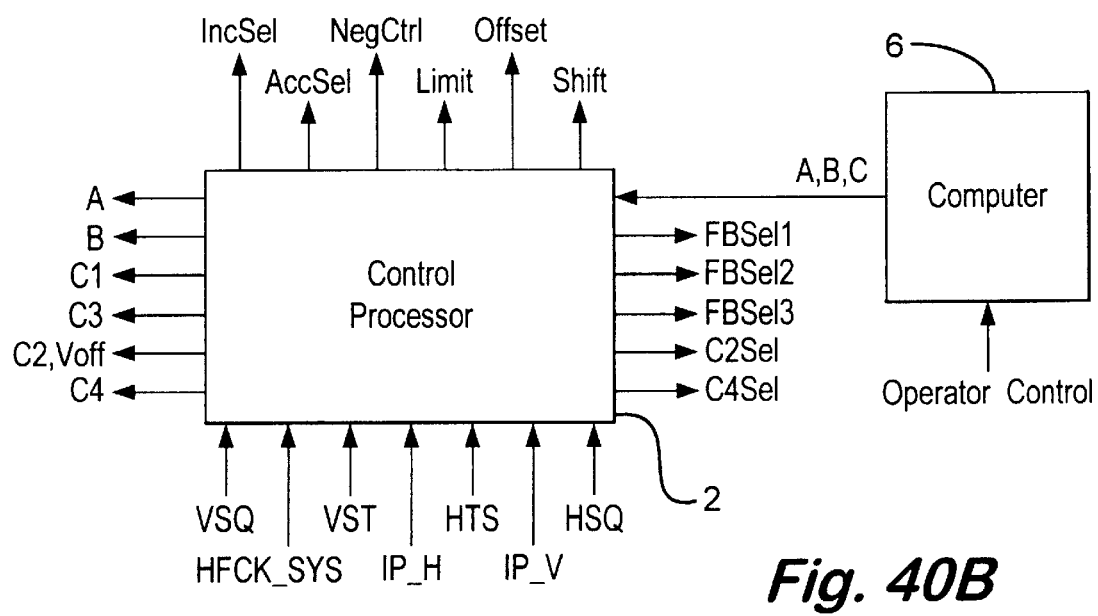
FIG. 40 is a schematic block diagram of a ramp generator of the system of FIG. 37.
Figure 39:
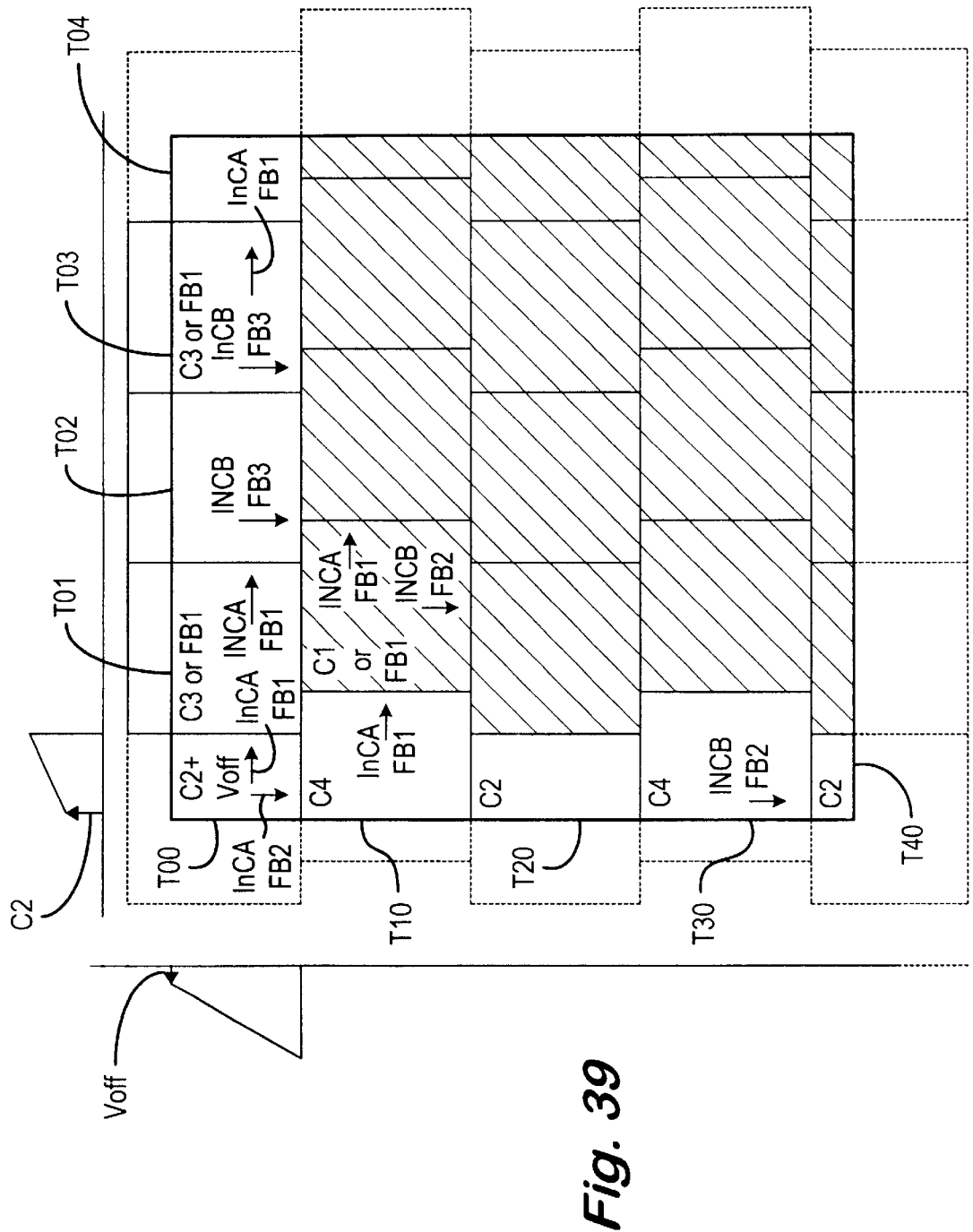
FIG. 39 is a diagram showing the use of the registers of a ramp generator of the system FIG. 38 in relation to a set of multiple wipe patterns.
Figure 40A:
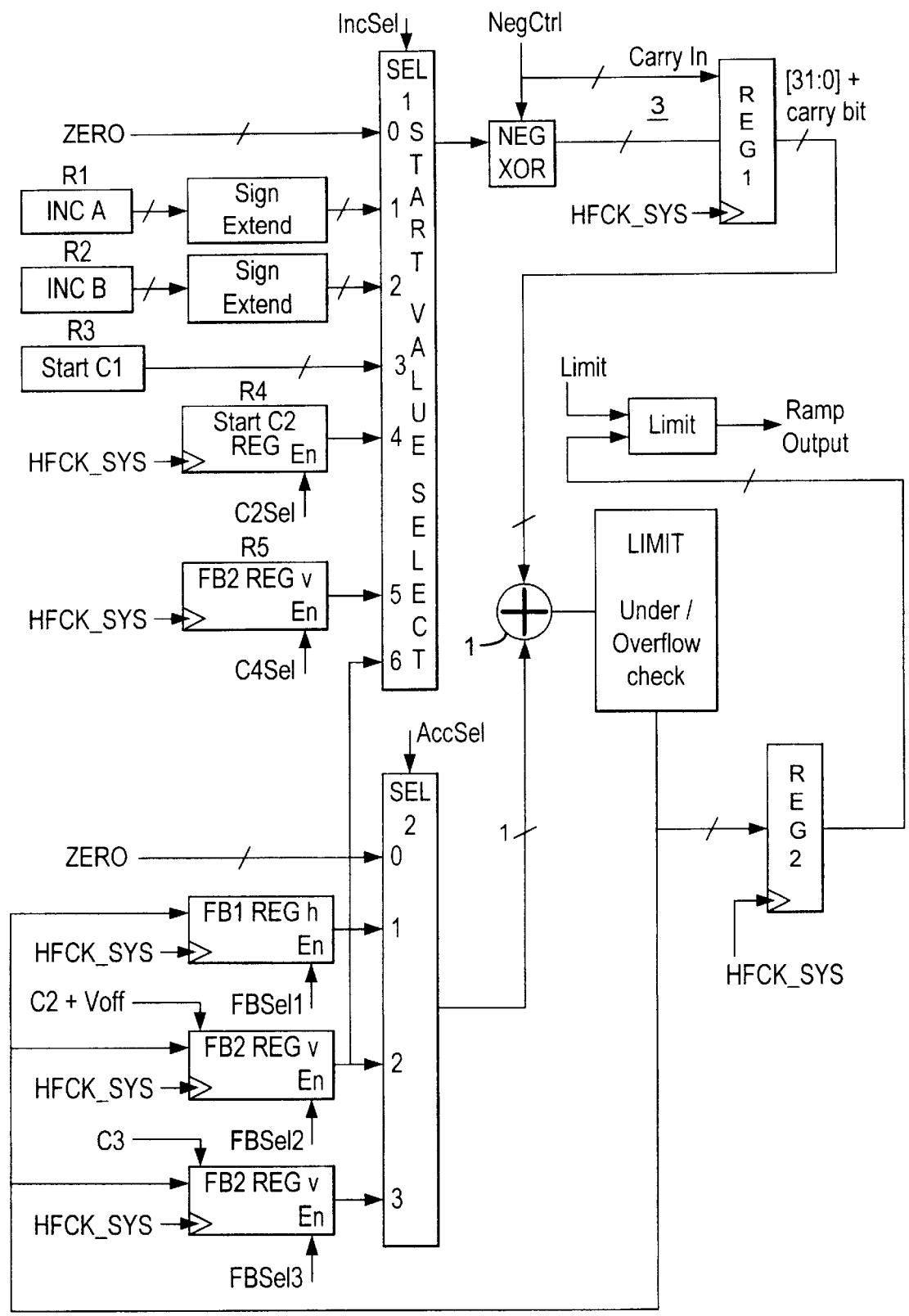

FIG. 40 shows an embodiment of the ramp generator of FIG. 5 modified to implement the production of arrays of tiles as shown in FIGS. 29 to 33, 36, 37 and 39. The generator differs from that of FIG. 5 by the addition of Start registers C2 and C4 and of feedback register FB3. FIG. 39 shows by way of example an array of tiles subject to phase offset and, on odd rows, additional shift. It is initially assumed that all the shaded tiles away from the left and top edges of the frame, contain identical ramps defined by $$R=Ah+Bv+C1.$$

These ramps are generated in the same way as discussed above with reference to FIG. 5. The horizontal accumulation takes place in register FB1. The values of the coefficients A, B and C1 are stored in registers R1, R2 and R3 as in FIG. 5.

The unshaded tiles at the left and top edges are subject to different starting values than the shaded tiles because they are offset relative to the edges of the frame The starting value, C2+ a vertical offset value, of the top left tile T00 is (C1+a horizontal phase offset value+a vertical offset value). This value C2+Voff is stored in feedback register FB2 because it is needed only once at the beginning of an array of tiles and is also the initial value for the vertical accumulation in register FB2. The register FB2 has a connection from its output to the start value selector SEL1. The start value C4 of the left hand tile T10 of the next row is (C1+the horizontal phase offset value+the horizontal shift value). This value is stored in register R5. The start value of the next left-hand tile T20 is C2 which is stored in the register R4 and is needed for all even row tiles. The start values of the tiles T01 to T04 of the top row of tiles are each C3 which is (C1+the vertical offset value). This value is stored in start register FB3 because it is needed as a start value only on the first line of the first row of tiles T01 to T04 and is the start value for the vertical accumulation in that register. The output of register FB3 is connected to the selector SEL2. The horizontal accumulation of the ramp values for the unshaded tiles T00 to T04 and T10 to T40 takes place in feedback register FB1. The vertical accumulation of the vertical edge tiles T00 and T10 to T40 takes place in register FB2. The vertical accumulation of all the other tiles takes place in register FB3.

If the tiles are subject to horizontal ramp inversion as shown in for example FIG. 23, then the start values of the tiles T01 to T04 is not C3 but the value stored in register FB1 at the end of the previous tile T00: that value is decremented and incremented alternately on successive tiles T01 to T04 of the top row. The subsequent rows are treated similarly.

Similarly in the vertical direction inversion of ramps may be performed by starting each ramp with the value stored in the register FB2 or FB3 at the end of the previous tile and incrementing or decrementing it.

Figure 38:
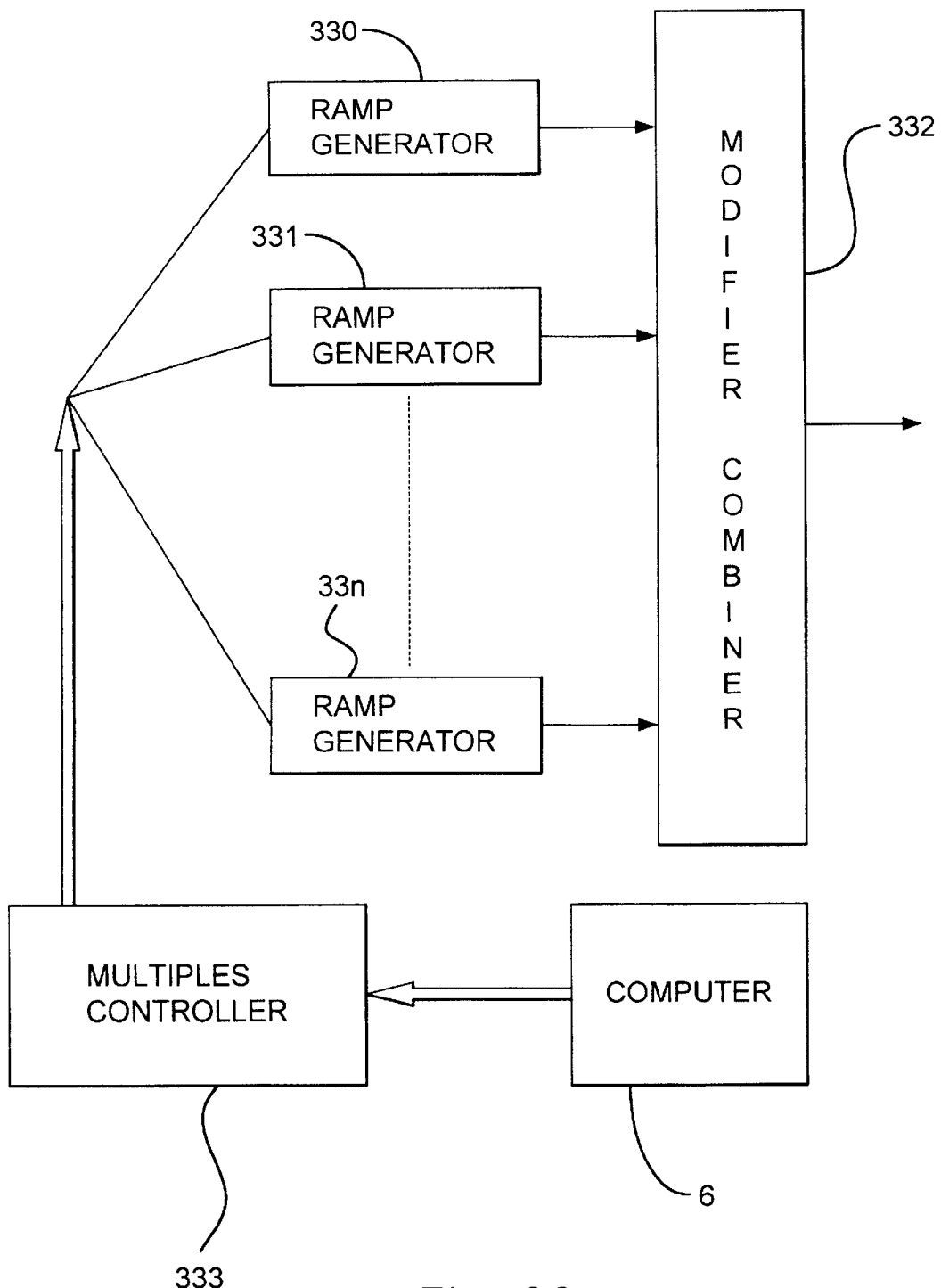
FIG. 38 is a schematic block diagram of a ramp generator system for producing the patterns of FIGS. 29 to 33 and 37.

The foregoing description assumes that each tile contains only a simple ramp. In practice, although each tile could contain only a simple ramp, the tiles would contain a solid defined by a combination of ramps and/or ramps modified by limiting, modulation and/or absoluting. Thus in a preferred embodiment of the invention as shown in FIG. 38, a plurality n of ramp generators 330 to 33n are identically controlled by a multiples controller 333 including the vertical and horizontal control signal generators of FIGS. 34 and 35 also controlling the computer interface 6 (see also FIG. 40). The ramp generators produce different ramps as defined by different values of A, B and C produced by the computer 6 to define the desired solids. The ramps which are simultaneously produced are combined and/or modified in a combiner/modifier 332 which may be as shown in FIGS. 9 to 11.

The computer 6 calculates coefficients depending on the solids to be generated and on any control (such as rotation) of the solids. The coefficients A, B, C including any horizontal and vertical offsets are generated once per frame in advance of the frame in which they are used to generate ramps.

The ramp generator of FIG. 40 is controlled to produce ramps which are confined to the respective tiles. The controller 333 of the ramp generator responds, inter alia, to the signal IP_H, IP_V, HTS and VTS defining respectively the start of a line, the start of the active position of a frame, the horizontal tile start position and the vertical tile start position. IP_H and IP-V indicate edge tiles and thus the selection of the values of C to be used for edge tiles. HTS and VTS indicate the shaded, non-edge tiles and thus selection of the value of C for these tiles. Coefficients A and B are the same for all tiles for one ramp: different ramps have different values of A and B. Accumulation horizontally begins with the IP_H pulse, in for example register FB1. At the next HTS pulse, the content of the register FB1 is set to its start value appropriate to the tile. Accumulation vertically for each tile occurs in response to IP_V for edge tiles and VTS for non-edge tiles.

If, in the masking mode, the tiles are shifted leftwards and/or upwards, the accumulation proceeds to the right and/or bottom edges of the frame to allow a wipe to proceed to the edge of the frame.

The foregoing description assumes a progressively scanned frame. The invention is applicable to interlaced fields.

I claim:

1. A solid generator comprising:

a ramp generator for producing a ramp signal R $$R=Ah+Bv+C$$

where the coefficients

A, B and C are signed values, the ramp signal R being produced for each pixel of a predetermined set of pixels h where h=0 to n of each of a predetermined set of lines v where v=0 to m;

a coefficient generator for generating the values of the coefficients A, B and C;

control means for causing the ramp signal to be generated with the same values of A and B in each of a plurality of contiguous tiles of a picture;

wherein the ramp generator comprises:
means for storing the coefficients A, B, and C and first and second accumulated values,
adding means for incrementing the first accumulated value by A and the second accumulated value by B, and
control means by which, for each of the said lines v, the second accumulated value is incremented by the adding means by B to form C+Bv which is stored as both the first and the second accumulated values, and for each pixel of the said set of pixels on each of the said lines the first accumulated value is incremented by the adding means to form $$C+Bv+Ah$$

which is stored as the first accumulated value and is output as R.

2. A solid generator according to claim 1, wherein the storing means of the ramp generator comprises coefficient registers for storing respective ones of A, B and C and feedback registers for storing the first and second accumulated values, and selecting means for selectively coupling the registers to the adding means and for storing the output of the adding means in at least one of the feedback registers.

3. A solid generator according to claim 2, wherein the output of the adding means of the ramp generator is coupled to the feedback registers, and the control means selectively enables the registers to store the accumulated values.

4. A solid generator according to claim 2, wherein the ramp generator comprises a further feedback register for storing a further accumulated value and coupled to the said selecting means.

5. A solid generator according to claim 2, wherein the ramp generator further comprises at least one further coefficient register for storing a coefficient, and coupled to the selecting means.

6. A solid generator according to claim 2, wherein the selecting means of the ramp generator comprises a first selector for selectively coupling the coefficient registers to the adding means and a second selector for selectively coupling the feedback registers to the adding means.

7. A solid generator according to claim 2, wherein one or more of the feedback registers of the ramp generator are preloadable with predetermined values.

8. A solid generator according to claim 2, wherein the ramp generator further comprises means for selectively inverting the sign of the coefficients before application to the adding means.

9. A solid generator comprising:
a plurality P of ramp generators each for producing a ramp signal $$Rp=Aph+Bpv+Cp$$

where p=1 to P
where the coefficients Ap, Bp and Cp are signed values, the ramp signal Rp being produced for each pixel of a predetermined set of pixels h where h=0 to n of each of a predetermined set of lines v where v=0 to m;
means for generating coefficients Ap, Bp and Cp for the ramp generators;
control means for causing each ramp signal Rp to be generated with its same values Ap and Bp in each of a plurality of contiguous tiles of a picture;
means for combining the ramp signals, where the means for combining the ramp signals receives each of the ramp signals to be combined separately;

wherein each ramp generator comprises:
means for storing the coefficients Ap, Bp, and Cp and first and second accumulated values,
adding means for incrementing the first accumulated value by Ap and the second accumulated value by Bp, and
control means by which, for each of the said lines v, the second accumulated value is incremented by the adding means by Bp to form Cp+Bpv which is stored as both the first and the second accumulated values, and for each pixel of the said set of pixels on each of the said lines the first accumulated value is incremented by the adding means to form $$Cp+Bpv+Aph$$

which is stored as the first accumulated value and is output as Rp.

10. A generator according to claim 9, wherein the storing means of each ramp generator comprises coefficient registers for storing respective ones of A, B and C and feedback registers for storing the first and second accumulated values, and selecting means for selectively coupling the registers to the adding means and for storing the output of the adding means in at least one of the feedback registers.

11. A generator according to claim 10, wherein the output of the adding means of each ramp generator is coupled to the feedback registers, and the control means selectively enables the registers to store the accumulated values.

12. A generator according to claim 10, wherein each ramp generator comprises a further feedback register for storing a further accumulated value and coupled to the said selecting means.

13. A generator according to claim 10, wherein each ramp generator further comprises at least one further coefficient register for storing a coefficient, and coupled to the selecting means.

14. A generator according to claim 10, wherein the selecting means of each ramp generator comprises a first selector for selectively coupling the coefficient registers to the adding means and a second selector for selectively coupling the feedback registers to the adding means.

15. A generator according to claim 10, wherein one or more of the feedback registers of each ramp generator are preloadable with predetermined values.

16. A generator according to claim 10, wherein each ramp generator further comprises means for selectively inverting the sign of the coefficients before application to the adding means.

17. A solid generator comprising:
a plurality P of ramp generators each for producing a ramp signal $$Rp=Aph+Bpv+Cp$$

where p=1 to P
where the coefficients Ap, Bp and Cp are signed values, the ramp signal Rp being produced for each pixel of a predetermined set of pixels h where h=0 to n of each of a predetermined set of lines v where v=0 to m;
means for generating coefficients Ap, Bp and Cp for the ramp generators;
control means for causing each ramp signal Rp to be generated with its same values Ap and Bp in each of a plurality of contiguous tiles of a picture;
means for combining the ramp signals, where the means for combining the ramp signals receives each of the ramp signals to be combined separately;

means for offsetting the positions of the boundary signals relative to at least one edge of the picture and for correspondingly offsetting the values of coefficients Cp of ramps in tiles adjacent the said at least one edge; and means for selecting alternate rows of tiles, the offsetting means being responsive to the selecting means to offset the positions of alternate rows of tiles relative to the intervening rows;

wherein the control means comprises means for producing boundary signals indicating the boundaries of the tiles.

18. A solid generator comprising:

a plurality P of ramp generators each for producing a ramp signal $$Rp=Aph+Bpv+Cp$$

where p=1 to P where the coefficients Ap, Bp and Cp are signed values, the ramp signal Rp being produced for each pixel of a predetermined set of pixels h where h=0 to n of each of a predetermined set of lines v where v=0 to m;

means for generating coefficients Ap, Bp and Cp for the ramp generators;

control means for causing each ramp signal Rp to be generated with its same values Ap and Bp in each of a plurality of contiguous tiles of a picture;

means for combining the ramp signals, where the means for combining the ramp signals receives each of the ramp signals to be combined separately; and means for varying the positions of boundary signals relative to at least one edge of the picture and for correspondingly varying the values of coefficients Cp of ramps in tiles adjacent the said at least one edge;

wherein the control means comprises means for producing boundary signals indicating the boundaries of the tiles.

* * * * *